US008853870B2

(12) United States Patent
Moss

(10) Patent No.: US 8,853,870 B2
(45) Date of Patent: Oct. 7, 2014

(54) VIBRATION ENERGY CONVERSION DEVICE

(75) Inventor: Scott David Moss, Coburg (AU)

(73) Assignee: The Commonwealth of Australia, Fishermans Bend (AU)

( * ) Notice: Subject to any disclaimer, the term of this patent is extended or adjusted under 35 U.S.C. 154(b) by 232 days.

(21) Appl. No.: 13/464,701

(22) Filed: May 4, 2012

(65) Prior Publication Data
US 2012/0280516 A1 Nov. 8, 2012

Related U.S. Application Data

(60) Provisional application No. 61/482,496, filed on May 4, 2011.

(51) Int. Cl.
F02B 63/04 (2006.01)
F03G 7/08 (2006.01)
H02K 7/18 (2006.01)
H02K 35/06 (2006.01)

(52) U.S. Cl.
CPC . *F03G 7/08* (2013.01); *H02K 35/06* (2013.01)
USPC ...................................................... 290/1 R

(58) Field of Classification Search
CPC ............ H02K 35/06; F03G 7/08; H02N 2/18
USPC ................................. 290/1 R; 310/15, 28, 26
See application file for complete search history.

(56) References Cited

U.S. PATENT DOCUMENTS

| 5,347,186 | A | 9/1994 | Konotchick |
| 7,259,492 | B2 | 8/2007 | Yang |
| 7,569,952 | B1 | 8/2009 | Bono et al. |
| 8,519,554 | B2 * | 8/2013 | Kaplan ..................... 290/1 R |
| 2009/0085359 | A1 | 4/2009 | Mabuchi et al. |
| 2009/0167033 | A1 | 7/2009 | Rapoport |
| 2010/0187835 | A1 | 7/2010 | Hohlfeld et al. |
| 2011/0187207 | A1 | 8/2011 | Arnold et al. |

FOREIGN PATENT DOCUMENTS

| RU | 2425438 C1 | 7/2011 |
| WO | 2010/151738 A2 | 12/2010 |
| WO | 2012/054994 A2 | 5/2012 |

OTHER PUBLICATIONS

Arnold, D., "Review of Microscale Magnetic Power Generation," *IEEE Transactions on Magnetics* 43(11):3940-3951, 2007.

(Continued)

*Primary Examiner* — Javaid Nasri
(74) *Attorney, Agent, or Firm* — Seed IP Law Group PLLC

(57) ABSTRACT

Some embodiments relate to an energy conversion device comprising: a casing; a magnet disposed in the casing: an object in the casing attracted to the magnet and free to move relative to the magnet in at least two degrees of freedom; and at least one transducer element positioned to be affected by changes in a magnetic field of the magnet; wherein movement of the object relative to the magnet varies the magnetic field through the at least one transducer element, thereby generating electrical potential across a part of the at least one transducer element. In some embodiments, the transducer element may comprise a magnetostrictive piezoelectric (MP) element and the electrical potential may be generated across a piezoelectric part of the MP element. Alternatively, the transducer element may comprise an electromagnetic (EM) coil element.

27 Claims, 14 Drawing Sheets

(56) References Cited

OTHER PUBLICATIONS

Barry et al., "Effect of Gap-Size Δ on the Output Power of a Vibro-Impacting Power Harvester," URL=http://aip.org.au/Congress2010/Abstracts/Monday%206%20Dec%20%20Poster%20Session%201/RE/Barry_Effect_of_Gap-Size.pdf, 2010, 1 page.

Dai et al., "Modeling, Characterization and Fabrication of a Vibration Energy Harvester Using Terfenol-D/PZT/Terfenol-D Composite Transducer," *Sensors and Actuators A: Physical 156*:350-358, 2009.

Dai et al., "Energy Harvesting From Mechanical Vibrations Using Multiple Magnetostrictive/Piezoelectric Composite Transducers," *Sensors and Actuators A: Physical 166*:94-101, 2011.

Erturk et al., "Broadband Piezoelectric Power Generation on High-Energy Orbits of the Bistable Duffing Oscillator with Electromechanical Coupling," *Journal of Sound and Vibration 330*:2339-2353, 2011.

Fiebig, M., "Revival of the Magnetoelectric Effect," *J. Phys. D: Appl. Phys 38*:R123-R152, 2005.

Ma et al., "Recent Progress in Multiferroic Magnetoelectric Composites: from Bulk to Thin Films," *Advanced Materials 23*:1062-1087, 2011.

Moon et al., "A Magnetoelastic Strange Attractor," *Journal of Sound and Vibration 65*(2):275-296, 1979.

Moon et al., The Fractal Dimension of the Two-Well Potential Strange Attractor, *Physica 17D*:99-108, 1985.

Moss et al., "A Low Profile Vibro-Impacting Energy Harvester with Symmetrical Stops," *Applied Physics Letters 97*:234101-1-234101-3, 2010.

Moss et al., "Vibro-Impacting Power Harvester," *Proc. of SPIE 7643*:76431A-1-76431A-12, 2010.

Moss et al., "Broad-Band Vibro-Impacting Energy Harvester," *Materials Science Forum 654-656*:2799-2802, 2010.

Moss et al., "A Broadband Vibro-Impacting Power Harvester with Symmetrical Piezoelectric Bimorph-Stops," *Smart Materials and Structures 20*, 2011, 12 pages.

Moss et al., "A Bi-Axial Magnetoelectric Vibration Energy Harvester," *Sensors and Actuators A: Physical 175*: 165-168, 2012.

Moss et al., "Wideband Vibro-Impacting Vibration Energy Harvesting Using Magnetoelectric Transduction," *Journal of Intelligent Material Systems and Structures*, 2012, 12 pages.

Ryu et al., "Magnetoelectric Properties in Piezoelectric and Magnetostrictive Laminate Composites," *Jpn. J. Appl. Phys. 40*:4948-4951, 2001.

Yang et al., "Design, Analysis of Broadband Vibration Energy Harvester Using Magnetoelectric Transducer," URL = http://cap.ee.ic.ac.uk/~pdm97/powermems/2010/oral-pdfs/053_Yang_88.pdf, 2010, 4 pages.

Amirtharajah et al., "Self-Powered Signal Processing Using Vibration-Based Power Generation," *IEEE Journal of Solid-State Circuits 33*(5), May 1998, 9 pages.

Ayala-Garcia et al., "A tunable kinetic energy harvester with dynamic over range protection," *Smart Mater. Struct. 19*, 115005, 2010, 11 pages.

Beeby et al., "A micro electromagnetic generator for vibration energy harvesting," *J. Micromech. Microeng. 17*:1257-1265, 2007.

Beeby et al., "Experimental comparison of macro and micro scale electromagnetic vibration powered generators," *Microsyst Technol 13*:1647-1653, 2007.

Bowers et al., "Spherical, rolling magnet generators for passive energy harvesting from human motion," *J. Micromech. Microeng. 19*, 094008, 2009, 7 pages.

Cao et al., "Electromagnetic Energy Harvesting Circuit With Feedforward and Feedback DC-DC PWM Boost Converter for Vibration Power Generator System," *IEEE Transactions on Power Electronics 22*(2), Mar. 2007, 7 pages.

Cepnik et al., "Effective optimization of electromagnetic energy harvesters through direct computation of the electromagnetic coupling," *Sensors and Actuators A 167*:416-421, 2011.

Challa et al., "A vibration energy harvesting device with bidirectional resonance frequency tunablity," *Smart Mater. Struct. 17*, 015035, 2008, 11 pages.

Ching et al., "A laser-micromachined multi-modal resonating power transducer for wireless sensing systems," *Sensors and Actuators A 97-98*:685-690, 2002.

El-hami et al., "Design and Fabrication of a New Vibration-Based Electromechanical Power Generator," *Sensors and Actuators A: Physical 92*(1-3), 2001, 21 pages.

Galchev et al., "A Parametric Frequency Increased Power Generator for Scavenging Low Frequency Ambient Vibrations," *Procedia Chemistry 1*:1439-1442, 2009.

Glynne-Jones et al., "An electromagnetic, vibration-powered generator for intelligent sensor systems," *Sensors and Actuators A 110*:344-349, 2004.

Hoffman et al., "Flexible Polyimide Film Technology for Vibration Energy Harvesting," PowerMEMS 2009, Washington, D.C., USA, Dec. 1-4, 2009, 4 pages.

Huang et al., "A Silicon MEMS Micro Power Generator for Wearable Micro Devices," *Journal of the Chinese Institute of Engineers 30*(1):133-140, 2007.

Jang et al., "A tunable rotational energy harvester for low frequency vibration," *Applied Physics Letters 99*, 134102, 2011, 3 pages.

Kaźmierski and Beeby (eds.), *Energy Harvesting Systems—Principles, Modeling and Applications*, Springer, New York, 2011, 169 pages.

Khaligh et al., "Kinetic Energy Harvesting Using Piezoelectric and Electromagnetic Technologies—State of the Art," *IEEE Transaction on Industrial Electronics 57*(3), Mar. 2010, 11 pages.

Koukharenko et al., "Microelectromechanical systems vibration powered electromagnetic generator for wireless sensor applications," *Microsyst Technol 12*:1071-1077, 2006.

Kulah et al., "An Electromagnetic Micro Power Generator for Low-Frequency Environmental Vibrations," *Proceedings of the 17th IEEE International Conference on Micro Electro Mechanical Systems*, 2004, pp. 237-240.

Kulkarni et al., "Design, fabrication and test of integrated micro-scale vibration-based electromagnetic generator," *Sensors and Actuators A 145-146*:336-342, 2008.

Kulkarni et al., "Fabrication and Test of Integrated Micro-Scale Vibration Based Electromagnetic Generator," Transducers & Eurosensors '07, The 14th International Conference on Solid-State Sensors, Actuators and Microsystems, Lyon, France, Jun. 10-14, 2007, 4 pages.

Mann et al., "Investigations of a nonlinear energy harvester with a bistable potential well," *Journal of Sound and Vibration 329*:1215-1226, 2010.

Nakano et al., "A Portable Generator Using Vibration Due to Human Walking," Proceedings Power MEMS, 2002, pp. 114-117.

O'Donnell et al., "Scaling Effects for Electromagnetic Vibrational Power Generators," DTIP of MEMS & MOEMS, Stresa, Italy, Apr. 26-28, 2006, 7 pages.

Pan et al., "Fabrication and analysis of a magnetic self-power microgenerator," *Journal of Magnetism and Magnetic Materials 304*:e394-e396, 2006.

Park et al., "Micro-Fabricated Electromagnetic Power Generator to Scavenge Low Ambient Vibration," *IEEE Transactions on Magnetics 46*(6):1937-1942, Jun. 2010.

Sari et al., "An electromagnetic micro power generator for wideband environmental vibrations," *Sensors and Actuators A 145-146*:405-413, 2008.

Sasaki et al., "Vibration-based automatic power-generation system," *Microsyst Technol 11*:965-969, 2005.

Serre et al., "Design and implementation of mechanical resonators for optimized inertial electromagnetic microgenerators," *Proc. of SPIE*, vol. 6589, 658905-1, 2007, 8 pages.

Serre et al., "Vibrational energy scavenging with Si technology electromagnetic inertial microgenerators," *Microsyst Technol 13*:1655-1661, 2007.

Shearwood et al., "Development of an electromagnetic microgenerator," *Electronics Letters 33*(22):1883-1884, Oct. 23, 1997.

Soliman et al., "A wideband vibration-based energy harvester," *J. Micromech. Microeng. 18*, 115021, 2008, 12 pages.

(56) References Cited

OTHER PUBLICATIONS

Spreemann et al., "Novel non-resonant vibration transducer for energy harvesting," PowerMEMS 2005, Takeda Hall, The University of Tokyo, Tokyo, Japan, Nov. 28-30, 2005, 3 pages.

Stephen, "On energy harvesting from ambient vibration," *Journal of Sound and Vibration* 293:409-425, 2006.

Torah et al., "Self-powered autonomous wireless sensor node using vibration energy harvesting," *Meas. Sci. Technol.* 19, 125202, 2008, 8 pages.

Vandewater et al., "Non-linear dynamics of a vibration energy harvester by means of the homotopy analysis method," *Journal of Intelligent Material Systems and Structures*, 2013, 10 pages.

Vandewater et al., "Optimal coil transducer geometry for an electromagnetic nonlinear vibration energy harvester," *Key Engineering Materials* 558:477-488, 2013.

Wang et al., "A micro electromagnetic low level vibration energy harvester based on MEMS technology," *Microsyst Technol* 15:941-951, 2009.

Williams et al., "Development of an electromagnetic micro-generator," *IEEE Proc.-Circuits Devices Syst.* 148(6):337-342, Dec. 2001.

Xing et al., "High power density vibration energy harvester with high permeability magnetic material," *Jounal of Applied Physics 109*, 07E514, 2011, 3 pages.

Xing et al., "Wideband vibration energy harvester with high permeability magnetic material," *Applied Physics Letters 95*, 134103, 2009, 3 pages.

Yuen et al., "An AA-Sized Vibration-Based Microgenerator for Wireless Sensors," *IEEE Pervasive Computing* 6(1):64-72, 2007.

Zhu et al., "Design and experimental characterization of a tunable vibration-based electromagnetic micro-generator," *Sensors and Actuators A 158*:284-293, 2010.

Zorlu et al., "A Vibration-Based Electromagnetic Energy Harvester Using Mechanical Frequency Up-Conversion Method," *IEEE Sensors Journal 11*(2), Feb. 2011, 8 pages.

Office Action dated Feb. 12, 2014, for corresponding Australian Patent Application No. 2012202647, 5 pages.

\* cited by examiner

VIBRATION ENERGY CONVERSION DEVICE

CROSS REFERENCE TO RELATED APPLICATION

This application claims benefit under 35 U.S.C. 119(e) of U.S. Provisional Patent Application Ser. No. 61/482,496, filed May 4, 2011, which is incorporated herein by reference in its entirety.

TECHNICAL FIELD

Described embodiments relate generally to vibration energy conversion devices and systems deriving electrical energy from such devices.

BACKGROUND

Over the past decade, the ever-decreasing power requirements of electronic devices has lead to considerable scientific interest in energy harvesting technologies. In particular, there has been significant interest in the area of vibration energy harvesting (VEH), particularly for single-degree-of-freedom (SDOF) piezoelectric and magnetic harvesters. Although there are a number of commercially available SDOF harvesters, there exist a number of continuing challenges that prevent widespread application of VEH, such as limited operational bandwidth and low power density. In many practical applications, the direction of the incident vibration may vary, so another challenge is the uni-axial nature of many harvesters, particularly cantilever-based piezoelectric designs and SDOF electromagnetic designs.

In addition, existing SDOF vibration energy harvesters generally are relatively heavy and/or too large for some applications, particularly those in aerospace fields. Existing SDOF harvesting devices can generally only take advantage of vibration of the host structure along a single axis. For host structures such as aircraft, it may frequently be the case that the vibration energy associated with vibration of the host structure occurs across multiple axes.

It is desired to address or ameliorate one or more shortcomings or disadvantages associated with existing vibration energy conversion devices, or to at least provide a useful alternative thereto.

SUMMARY

Some embodiments relate to a vibration energy conversion device, comprising:
a casing:
a magnet disposed in the casing;
an untethered object in the casing and attracted to the magnet; and
at least one transducer element positioned to be affected by changes in a magnetic field of the magnet;
wherein movement of the object relative to the magnet varies the magnetic field through the at least one transducer element, thereby generating electrical potential across a part of the at least one transducer element.

The object may be free to move in at least two degrees of freedom. The degrees of freedom may be at least one of translational and rotational.

Some embodiments relate to an energy conversion device comprising:
a casing;
a magnet disposed in the casing:
an object in the casing attracted to the magnet and free to move relative to the magnet in at least two degrees of freedom; and
at least one transducer element positioned to be affected by changes in a magnetic field of the magnet;
wherein movement of the object relative to the magnet varies the magnetic field through the at least one transducer element, thereby generating electrical potential across a part of the at least one transducer element.

In some embodiments, the transducer element may comprise a magnetostrictive piezoelectric (MP) element and the electrical potential may be generated across a piezoelectric part of the MP element. Alternatively, the transducer element may comprise an electromagnetic (EM) coil element.

Some embodiments relate to an energy conversion device comprising:
a casing;
a magnet disposed in the casing:
an object in the casing attracted to the magnet and free to move relative to the magnet in at least two degrees of freedom; and
at least one magnetostrictive piezoelectric (MP) element positioned to be affected by changes in a magnetic field of the magnet;
wherein movement of the object relative to the magnet varies the magnetic field through the at least one MP element, thereby generating electrical potential across a piezoelectric part of the at least one MP element.

The object may be rounded. The object may be one of: spheroid, part-spheroid, frusto-spheroid, ovoid and part-ovoid. The object may be solid. The object may be a ball bearing, for example.

The magnet may be disposed at a fixed position in the casing. The casing may comprise a closed magnetically conductive or non-conductive container.

In the absence of vibration experienced by the casing, the magnet may tend to retain the object in a rest position. In the presence of vibration experienced by the casing, the object may tend to oscillate about the rest position. The magnet may be positioned to exert a magnetic restoring force on the object to bias the object to the rest position.

When the object is at rest, the object and magnet may be axi-symmetric about a single axis. The magnet and a piezoelectric element of the at least one MP element may be poled in a direction orthogonal to a plane in which the object is free to move.

The device may further comprise a movement limiting structure disposed around the object to limit movement of the object relative to the magnet.

The magnet may be one of a plurality of such magnets disposed in the casing.

The at least one MP element may comprise at least two MP elements positioned to be affected by the magnetic field of the magnet. Two of the at least two MP elements may be disposed on opposite sides of the object. One MP element of the at least one MP element may be disposed adjacent a rest position of the object. One MP element of the at least one MP element may be disposed between the object and the magnet.

Some embodiments relate to a self-powering sensor system, comprising:
a sensor;
a power supply local to the sensor and coupled to supply power to the sensor; and
the device as described above, arranged to provide electrical energy to the power supply.

Some embodiments relate to a structure, such as an aircraft or other vehicular structure, subject to vibration and having fixedly positioned thereon or therein the device as described above.

BRIEF DESCRIPTION OF THE DRAWINGS

Embodiments are described in further detail below, by way of example, with reference to the accompanying drawings, in which.

DETAILED DESCRIPTION

Described embodiments relate generally to vibration energy conversion devices and systems deriving electrical energy from such devices.

Embodiments relate generally to devices configured to convert kinetic energy associated with a host structure (experienced as vibrations by the device) into electrical energy using the combination of a movable object, a transducer element, such as a magnetostrictive/piezoelectric (MP) element or an electromagnetic coil element, and a magnet to which the object is attracted. Using this combination, movement of the object relative to the magnet varies the magnetic field through the transducer element to generate electrical energy. If the transducer element is an electromagnetic coil, the variation of the magnetic field through it induces current flow through the electromagnetic coil. If the transducer is an MP element, the variation of the magnetic field causes stresses which induce the piezoelectric part of the MP element to generate a potential difference (i.e. voltage) across at least a part of itself. This electrical energy may be used to charge a capacitor, which may in turn be used to trickle-charge a rechargeable power supply, such as a rechargeable battery. This rechargeable power supply may then be used to supply power to a sensor, whereby the sensor, the power supply and the energy conversion device form a self-powering sensor system when at least the energy conversion device is subject to accelerations inducing movement of the object relative to the magnet.

Employing an object that is untethered and/or free to move with at least two degrees of translational (as opposed to rotational) freedom allows kinetic energy associated with vibrations of a multi-directional nature to be harvested. Such arrangements may thus have applicability to aerospace applications or other applications where vibrations are frequently encountered.

Additionally, the described arrangements enable construction of a compact energy conversion device having relatively low mass and volume compared to SDOF energy harvesters, which is advantageous in some applications.

Some embodiments employ an inherently compact bi-axial VEH approach that utilizes a permanent-magnet/ball-bearing combination, which operates in conjunction with a magnetostrictive piezoelectric (MP) element, such as a Terfenol-D/PZT laminate transducer, which may be described as one example of a magnetoelectric (ME) transducer. Such embodiments may thus use an oscillating bearing to create magnetic flux steerage through a magnetoelectric laminate transducer to generate harvestable electrical power. However, as noted above, some embodiments may employ an electromagnetic coil as another example of a ME transducer. For illustration purposes, this description focuses mostly on use of a MP element as the ME transducer but this is not intended to limit the applicability of any described embodiments.

Figure 1A:
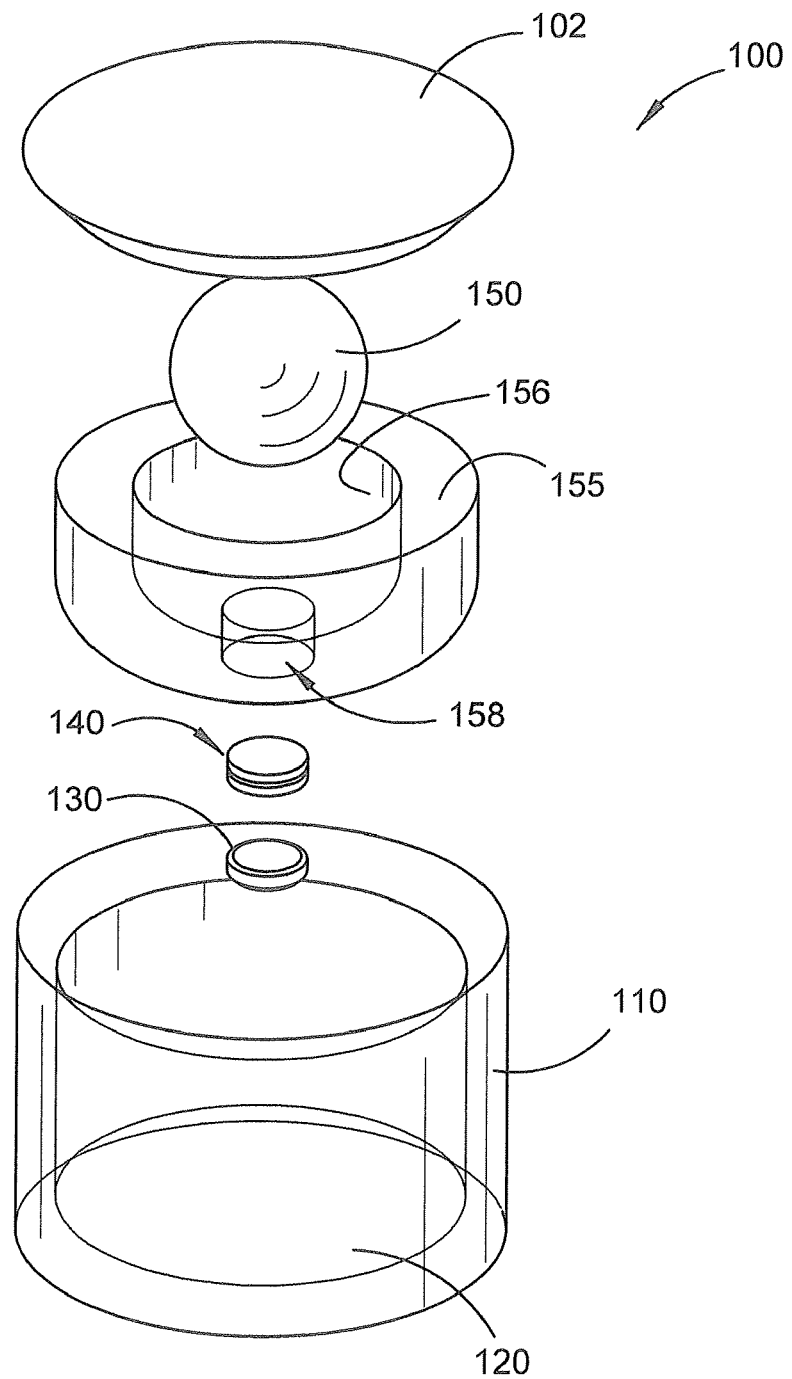
FIG. 1A is a schematic illustration in exploded perspective view of a vibration energy conversion device according to some embodiments.
Figure 1B:
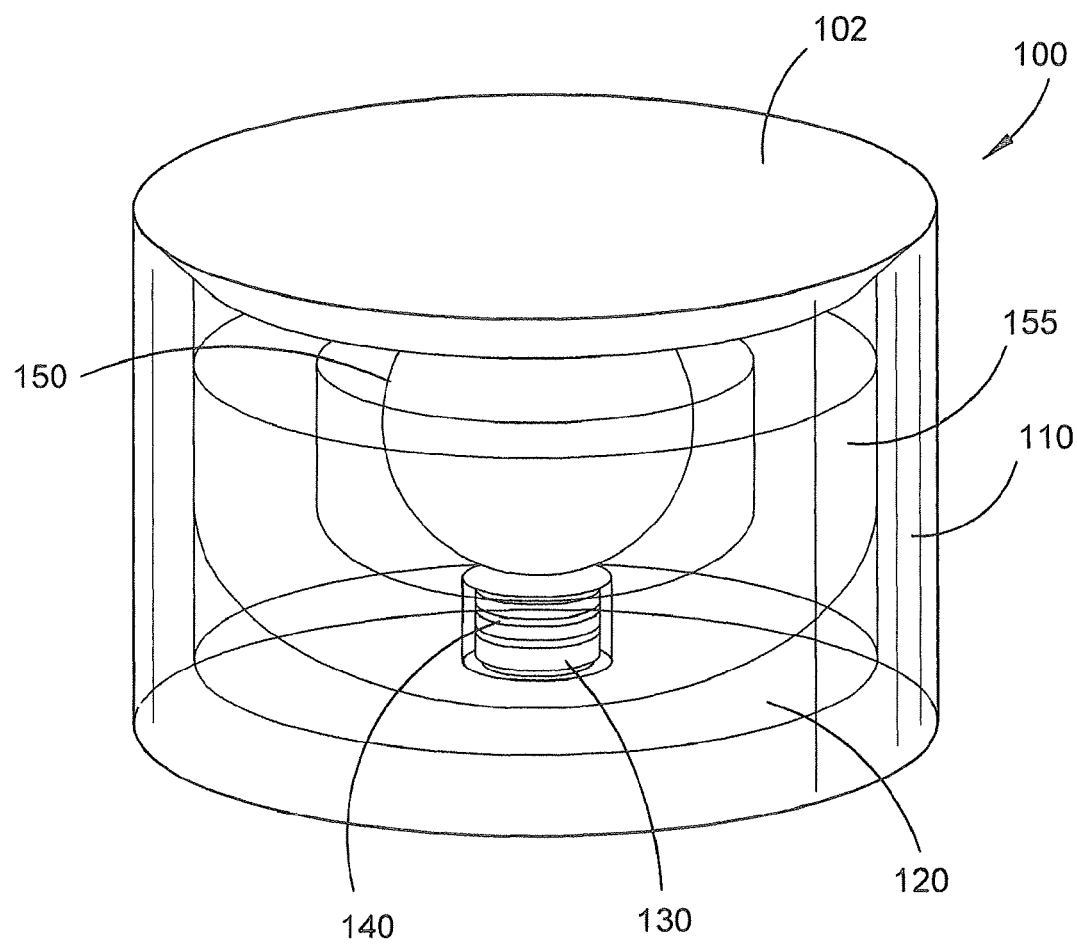
FIG. 1B is a schematic illustration of the device of FIG. 1A in perspective view.

Referring now to FIGS. 1A, 1B and 2 to 4, an energy conversion device 100 according to some embodiments is described in further detail. FIGS. 1A and 1B show device 100 in exploded and assembled configurations, respectively. Device 100 has a housing or casing 110 with a base 120 and a lid 102 cooperating to define an enclosed volume within the casing 110. Casing 110, including base 120 and lid 102, may be magnetically conductive, although it is not strictly necessary. Casing 110 may be generally cylindrical, cuboid or rectanguloid in form, for example. For illustration purposes, a cylindrical casing 110 is described herein.

Figure 4:
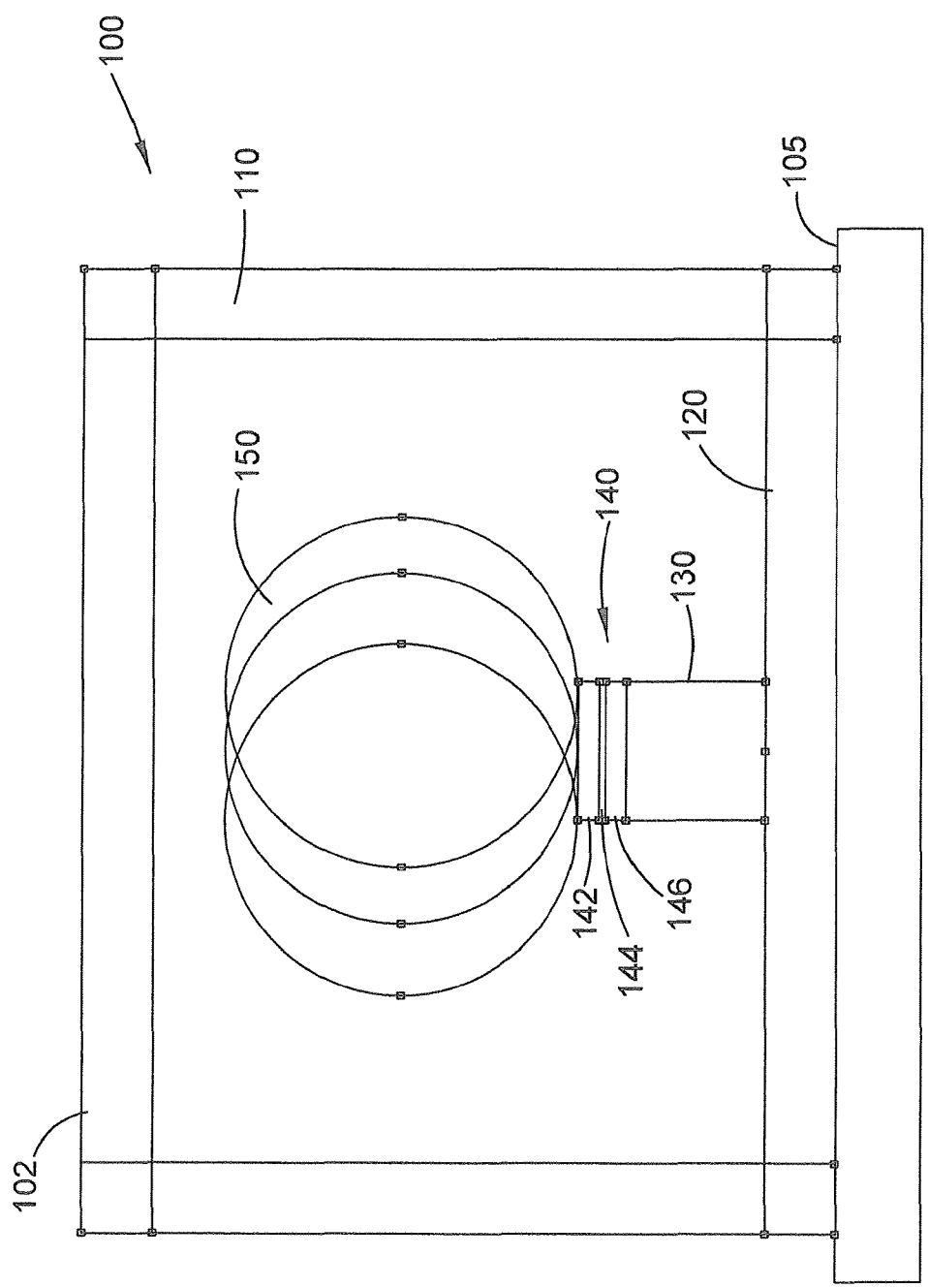
FIG. 4 is a schematic illustration of an energy conversion device according to some embodiments.

As shown in FIG. 4, casing 110 may be mounted on or otherwise coupled to a host structure 105 to have a chosen horizontal, vertical or angled orientation. Host structure 105 may be any suitable structure to which described energy conversion devices may be usefully coupled. The casing 110 is fixedly coupled, either directly or indirectly to the host structure 105 so that movement of the host structure 105 causes corresponding movement of the casing 110 and its contents (other than an untethered object 150).

As shown in FIGS. 1A and 1B, the object 150 is disposed within the enclosed volume of casing 110 in proximity to a magnet 130 and an MP element 140. The MP element 140 is positioned between the magnet 130 and the object 150, so that the magnetic field emanating from the magnet and coupled into the magnetically conductive object 150 passes through the MP element 140. This is illustrated in further detail in FIGS. 3A and 3B. The relative positioning of the magnet 130, MP element 140 and object are preferably selected to generally maximise the degree to which changes in object position are converted into electrical potential.

Device 100 may also comprise a movement limiting structure distinct from the walls of the casing 110 so that the object 150 is not allowed to move beyond where the magnet 130 can exert a magnetic restoring force on the object 150. Alternatively, walls of the casing 110 may act as a movement limiting structure, although in such embodiments, a non-magnetic insulating layer may be provided on the inside of the walls.

In the embodiments illustrated in FIGS. 1A and 1B, the movement limiting structure serves as a 360° mechanical stop and is provided by a non-magnetic cup-shaped element 155 having an interior surface 156 defining a central cavity within which the object 150 is receivable. The cup-shaped element 155 also has a passage or recess formed at the apex or bottom of the cavity to house the magnet 130 and MP element 140 in close proximity to the object 150. In some embodiments, the passage or recess 158 may provide a thin layer of material, such as a wear pad 152 (see FIGS. 15, 17 and 20), between the MP element 140 and the object 150 in order to mitigate wear on the MP element 140 by movement of the object 150.

The wear pad 152 may be formed as a thin disc of a hard material having a high Young's modulus (e.g. around 350 GPa or higher) and resistant to wear by the object 150 as the object 150 travels across the surface of the wear pad 152, for example. The Young's modulus of the wear pad 152 should be higher than the Young's modulus of the object 150, which for chrome-plated steel may be in the order of 300 GPa. The wear pad 152 is preferably substantially non-ferromagnetic. The material of the wear pad may be tungsten carbide or aluminium oxide, for example. The wear pad 152 may have a diameter of around 20-30 mm and a thickness of about 1.0 to 0.5 mm or possibly about 0.8 mm. Preferably, there is a low coefficient of sliding friction and rolling friction between the object 150 and the wear pad 152. A dry or fluid lubricant may be added at the interface between the object 150 and the wear pad 152.

In other embodiments, the object 150 may be allowed to substantially directly contact the MP element 140 or other transducer element, although some kind of coating or lubricant on the MP element 140 or other transducer element may be used to mitigate wear and/or affect the coefficient of friction between the object 150 and the MP element 140 or other transducer element.

The cup-shaped element 155 may be formed of Teflon, for example, or other materials having similar low magnetic conductivity and/or wear resistant characteristics. Materials other than Teflon that may be suitable include aluminium metal materials, rubber or rubber-like elastic materials, alumina ceramic materials and suitable polytetraflouroethylene (PTFE) materials or similar polymers. Depending on the embodiment, a wear pad 152 may be positioned at the base of the element 155 between the object 150 and the magnet 130 or MP element 140 or EM transducer as described below. The cup-shaped element 155 may have a roughly annular cross-section orthogonal to an axial centre line of the device (i.e. as indicated by reference indicator 170 in FIG. 2) with the annular cross-section of element 155 transitioning to a smaller inside diameter where it defines the passage or recess 158. If the casing 110 is magnetically conductive, then the thickness of the annular wall of element 155 may be selected to minimise magnetic attraction between object 150 and casing 110.

The Young's modulus of the movement limiting structure (where it will be impacted by the object 150) may be significantly lower than that of the object 150, for example by an order of magnitude or more. As an example, aluminium has a Young's modulus of around 60 GPa and has been found to work well in described embodiments as a material for the movement limiting structure and to provide a vibro-impact effect.

Figure 2:
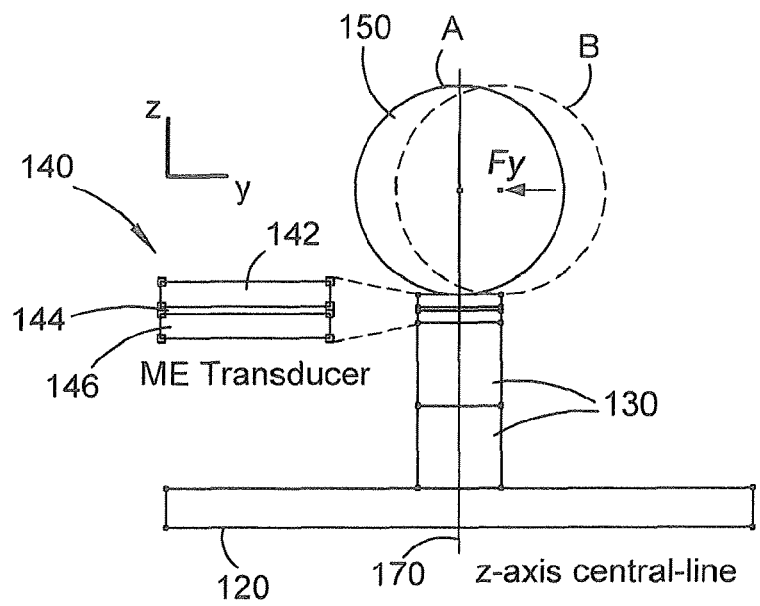
FIG. 2 is a schematic illustration of elements of a vibration energy conversion device according to some embodiments.

FIG. 2 is a schematic diagram of the permanent-magnet/ball-bearing oscillator arrangement forming part of device 100, and also shows the location of the ME transducer 140. FIG. 2 is provided primarily for illustration purposes to show that magnet 130 (or more than one magnet 130) exerts a restoring force Fy on an object 150 (in this case a substantially spherical object, such as a ball bearing, when it is in position B), tending to bias the object 150 towards a central rest position A, where the centroid of spherical object generally coincides with the axial centre line 170 of the device 100 that extends through the object 150, the MP element 140 and the one or more magnets 130.

FIG. 2 shows the MP element 140 in slightly more detail illustrating a piezoelectric layer 144 sandwiched between an upper magnetostrictive layer 142 and a lower magnetostrictive layer 146, The magnetostrictive layers 142, 146 may be formed of Terfenol-D, while the piezoelectric layer 144 may be a piezoceramic. Layers 142, 144 and 146 may be bonded in this sandwich arrangement by a suitable bonding agent, such as an epoxy, for example.

Figure 3A:
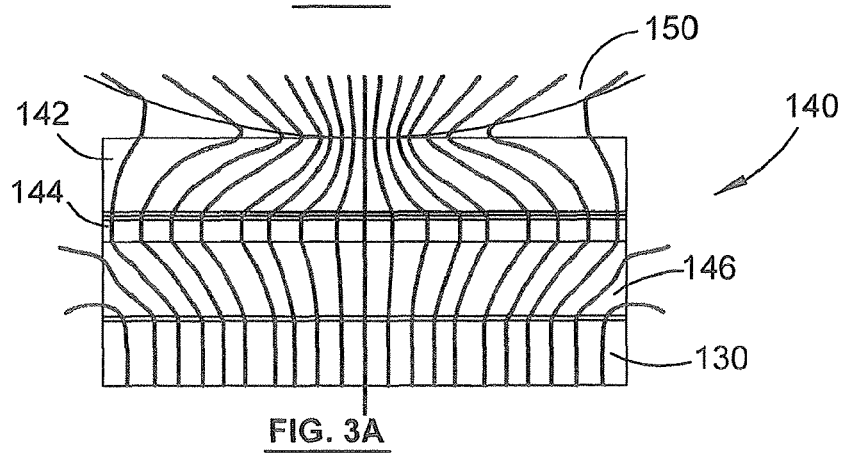
FIG. 3A is a magnified view of a magnetostrictive/piezoelectric (MP) element affected by a magnetic field of an adjacent magnet, illustrating predicted magnetic field lines for an object located centrally on the MP element.
Figure 3B:
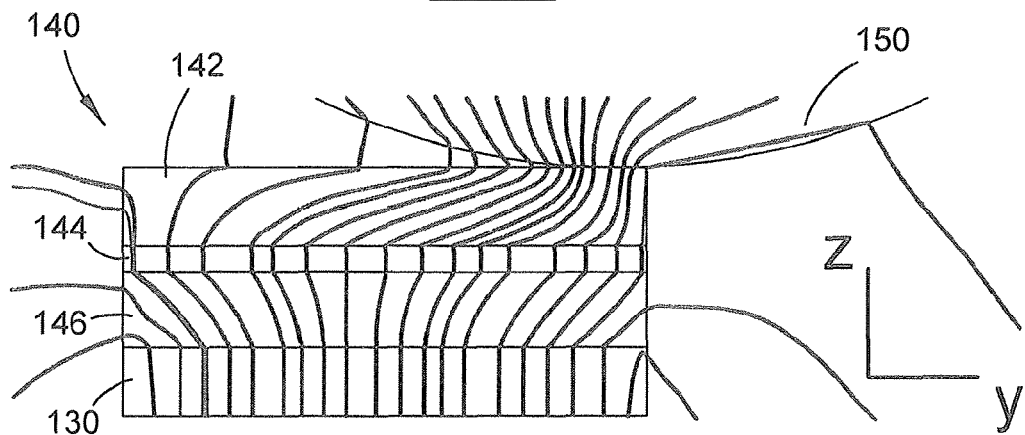
FIG. 3B is a magnified view similar to FIG. 3A, but showing the object having moved to an edge of the MP element.

FIGS. 3A and 3B illustrate predicted magnetic field lines through the object 150, MP element 140 and magnet 130 when the object 150 is in the rest position (FIG. 3A) and in an off centre position close to the edge of the upper magnetostrictive layer 142 (FIG. 3B). FIGS. 3A and 3B thus help to illustrate variation of the magnetic field through the MP element in response to movement of the object 150. Magnetic field variations in the MP element 140 in the order of about 0 to 250 mT are expected to occur with the described arrangements.

Embodiments described and depicted herein generally employ a spherical ball bearing as the movable object 150. However, another form of rounded object may be employed in alternative embodiments, including solid or partially solid objects. Such rounded objects include, for example, spheroid, part-spheroid, frusto-spheroid, ovoid and part-ovoid objects. The ball bearing described herein is formed of chromium plated steel. However, objects 150 of other magnetically responsive materials may be employed instead. If a spherical bearing is used as the object 150, it may have a diameter of about 15 mm to about 30 mm, for example. Preferably, the diameter is about 20 to 25 mm.

Figure 20:
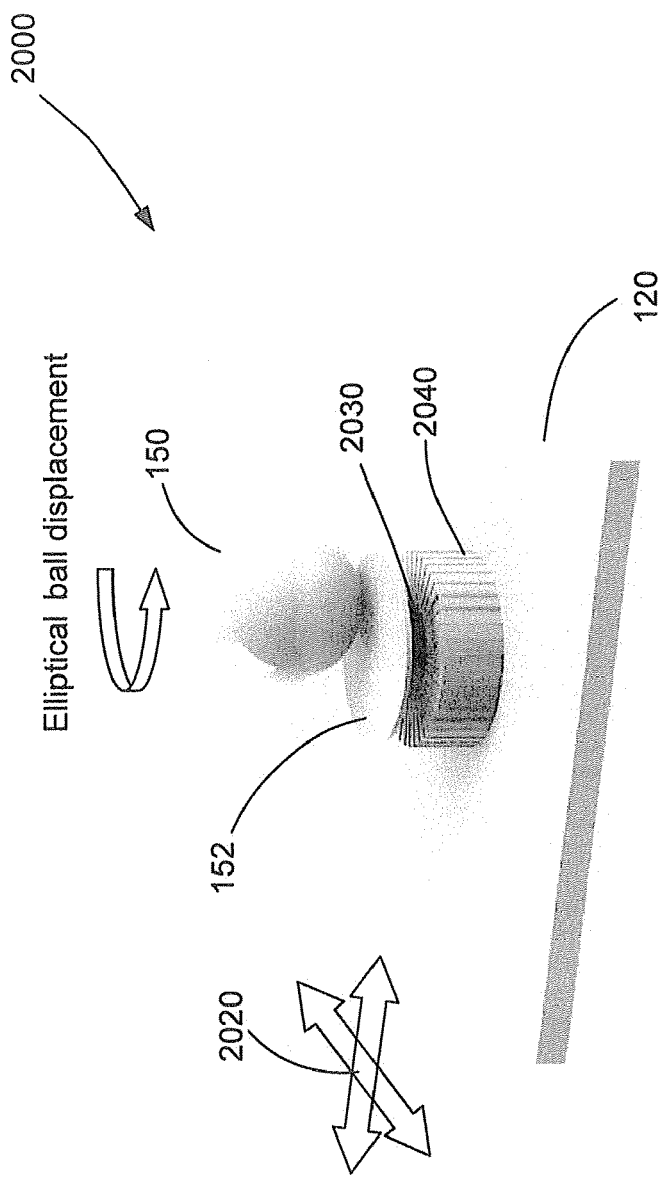
FIG. 20 is a schematic illustration of components of a vibration energy conversion device according to further embodiments.

In embodiments described herein, the object 150 is free to move in at least two dimensions. That is, the object 150 is free to move in at least the x and y directions if the central axis 170 defines the z axis of a three dimensional Cartesian coordinate system. Depending on the embodiment, the wear pad 152 or other support surface on which the object 150 may move may have some degree of curvature (like a curved bowl surface, for example), with the result that some movement in the z direction may occur simultaneously with movement in the x and y directions. Because the contemplated embodiments use a rounded object 150, this movement will involve freely rolling in at least the x and y directions and possibly also in the z direction, which equates to having at least two translational degrees of freedom. While it is contemplated that the object 150 will have the freedom to rotate (roll) about an axis generally parallel with the x-y plane and thus move translationally, it has been experimentally determined that for certain embodiments (such as are depicted in FIG. 20, for example) there may be rotation about the central axis 170 or an axis parallel thereto. In embodiments adopting the configuration shown and described in relation to FIG. 20, the object 150 may move in an elliptical or circular orbit about the z-axis.

For non-spherical objects or objects that are only part-spherical, the movement of the object 150 within the casing 110 may be less translational (i.e. rolling laterally away from or toward the central axis 170) and involve more rotational or rocking movement. Reference to translational movement of the object 150 herein is intended to refer to movement of the center of mass of the object. Depending on the shape of the object 150, the center of mass of the object 150 may not rotate significantly during the translational movement.

Described embodiments generally contemplate that the object 150 is mechanically untethered within the casing 110, with the only thing causing it to tend to return to the rest position (absent any externally applied vibrational stimulus) being the attraction of the object 150 to the magnet 130. In other words, the object 150 is not mechanically connected to anything in the casing 110. However, in alternative embodiments, it may be possible to have some mechanical connection or coupling that amounts to some form of tethering between the object 150 and a part or component in or on the casing 110, while still allowing at least two degrees of freedom of movement of the object 150 within the casing 110.

Referring also to FIG. 4, device 100 is depicted in the absence of movement limiting element 155 for illustration purposes, although element 155 may be included as illustrated in FIGS. 1A and 1B. FIG. 4 illustrates one of several possible configurations of the object 150, MP element 140 and magnet 130. In the depicted arrangement, the MP element 140 is directly interposed between the object 150 and the one or more magnets 130. However, in other embodiments, such as are described with reference to FIGS. 5 and 6, the MP element 140 may be positioned in a different arrangement, for example involving magnets on opposite sides of the object and one or more than one MP element 140 positioned around the object to be affected by variations in the magnetic field caused by movement of the object 150. Further, the MP element 140 is illustrated as one form of a generalised transducer element and can be substituted for an EM coil, such as is shown and described below in relation to FIGS. 17 and 20.

Figure 5:
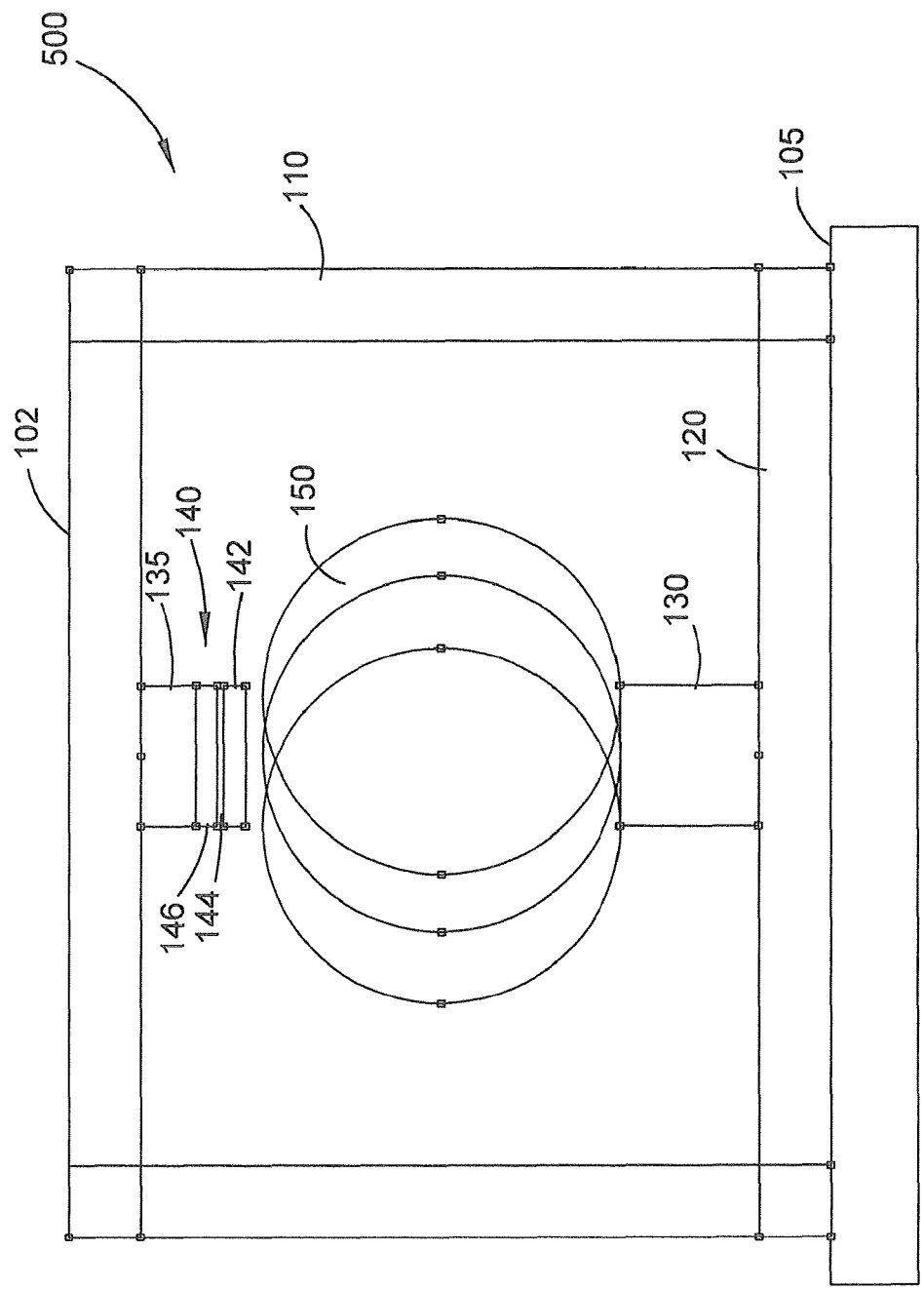
FIG. 5 is a schematic illustration of an energy conversion device according to further embodiments.

Referring to FIG. 5, an alternative arrangement of device 100 is shown, designated by reference numeral 500, by employing the same general components as described above. In arrangement 500, object 150 may be subject to a magnetic restoring force applied by the magnetic field of a magnet 130 with which it is in contact or closely adjacent thereto. Magnet 130 is coupled (i.e. mechanically or magnetically affixed or adhered) to the base 120. On an opposite side of magnet 130, MP element 140 is disposed together with a further magnet 135, both positioned along the same axial centre line 170 extending through the rest position of object 150 and magnet 130. In this arrangement, the magnetic field through object 150 and MP element 140 will be affected by both magnets 130 and 135, but movement of object 150 will still vary the magnetic field through MP element 140 in a manner generating electrical potential. Although not shown in FIG. 5, a wear pad 152 may be located between the object 150 and the magnet 130.

Figure 6:
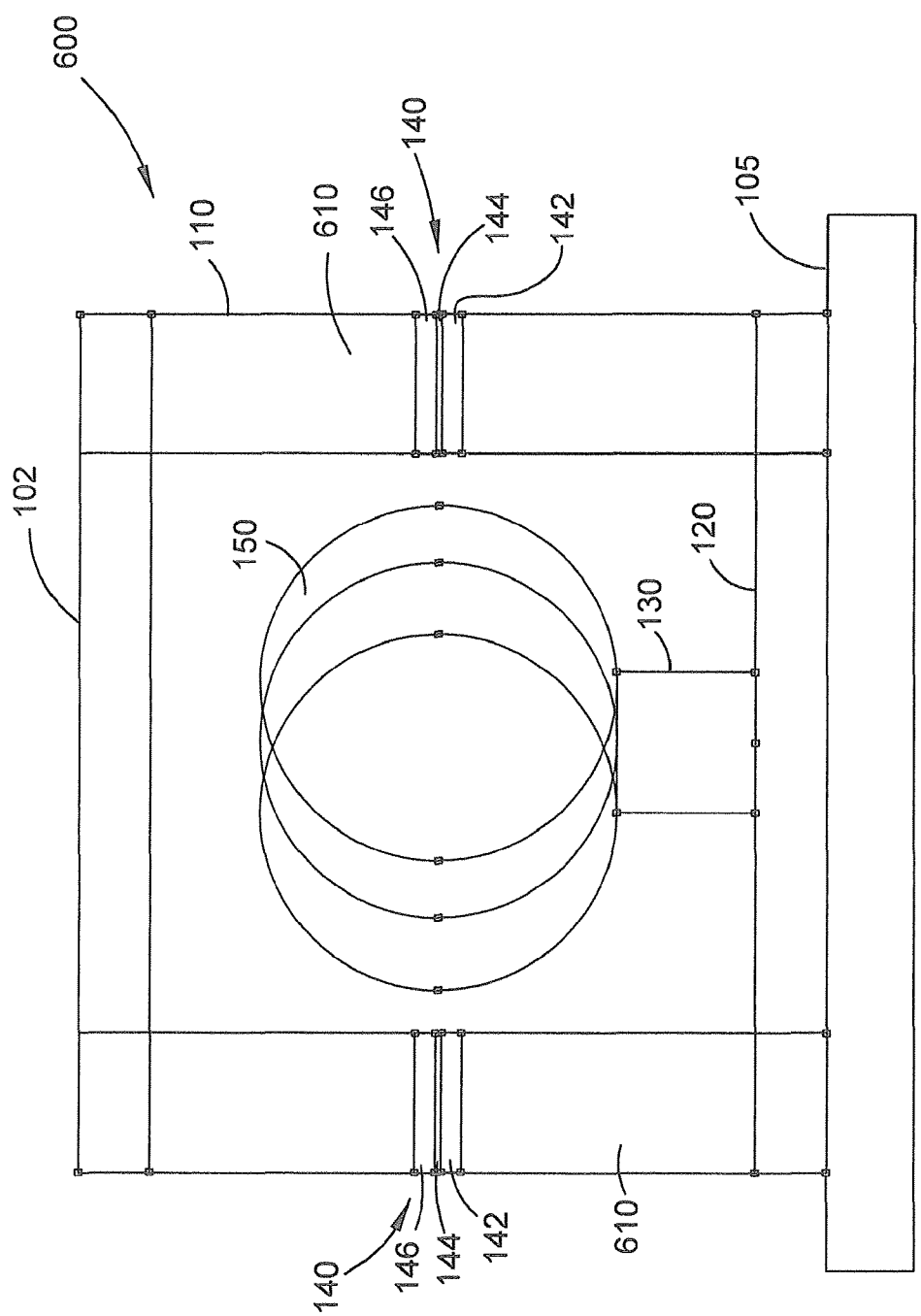
FIG. 6 is a schematic illustration of an energy conversion device according to further embodiments.

A further variation in the arrangement of elements within device 100 is shown in FIG. 6 and indicated by reference indicator 600. In arrangement 600, multiple MP elements 140 are positioned on opposite lateral sides (relative to 'vertical' centre line 170) of the object 150, with the MP elements again being poled in a direction generally orthogonal to the plane in which object 150 is free to move. In arrangement 600, MP elements 140 are positioned within closed wall sections 610 of the casing 110. In other embodiments, MP elements 140 may be positioned interiorly of the walls of casing 110 and held in place (with the same polar orientation as described) by other positioning structure. In some embodiments, the positioning structure to hold MP elements 140 in position relative to object 150 may include cup-shaped element 155 or a further positioning structure cooperating with the movement limiting structure. In the arrangement 600 shown in FIG. 6, the object 150 is magnetically coupled to magnet 130, which is in turn coupled (i.e. mechanically affixed or adhered) to the base 120 of the casing 110. In alternative arrangements, magnet 130 may be instead coupled to the lid 102. Although not shown in FIG. 6, a wear pad 152 may be located between the object 150 and the magnet 130.

Further variations of the described arrangements depicted in FIGS. 4 to 6 may be employed, including additional magnets 130, 135 and/or MP elements 140. For example, two or more of the arrangements shown in FIGS. 4, 5 and 6 may be combined. Additionally, more than one pair of MP elements shown in FIG. 6 may be employed, with MP elements positioned at 90° intervals around the casing. Further, more than two pairs of opposed MP elements 140 may be employed, such as 3, 4, 5 or 6 pairs of MP elements 140, for example, optionally arranged circumferentially.

While FIGS. 4, 5 and 6 show that casing 110 is coupled to host structure 105 via base 120, casing 110 may instead be coupled to host structure 105 along a side wall or coupled so that the orientation of the casing 110 relative to the host structure 105 is different from that shown.

Magnets 130 and 135 described herein may be rare earth magnets, for example. The magnets 130, 135 may have a remanent field of approximately 1.3 Tesla and the object 150 may be a chromium plated steel ball bearing of mass approximately 67 grams, for example. The magnetic fields generated by the one or more magnets 130, 135 serve a dual purpose: to generate a magnetic field that applies a magnetic restoring force to the object 150 which (possibly in combination with movement limiting structure) sets up oscillatory movement in response to an acceleration applied to the device 100; and the magnetic field serves to attract the object 150 under the magnet 130 such that if device 100 is exposed to an impulse acceleration, then object 150 tends to experience decaying oscillation about a rest position generally coinciding with a central axis 170. It should be noted that although generally circular cross-section magnets 130, 135, 1730 (FIG. 17), 2030 (FIG. 20) are shown and described herein, some embodiments may employ magnets 130, 135, 1730, 2030 that are non-circular, such as elliptical, rectangular or other suitable simple or regular polygon shapes. Further other magnets may be used that do not have a continuous surface or that are non-planar where such magnets are positioned adjacent the object 150 or the MP element 140 or coil 1740, 2040. One example of this is the annular magnet 2030.

Device 100 and the various described embodiments may be generally axi-symmetric about central axis 170, although it is understood that perfect symmetry is generally not achievable or is impractical to achieve. If casing 110 is not cylindrical and/or MP elements 140 are disposed at different lateral positions around object 150, then at least object 150 and magnets 130 and/or 135 are preferably generally axi-symmetric.

Although Terfenol-D is described as one possible magnetostrictive layer, Galfenol or other suitable materials may be employed in the magnetostrictive layer instead. Further, magnets 130 and 135 or MP elements 140 may have one or more of their surfaces coated with a ceramic material to reduce the effect of wear due to contact with the moving object 150.

Where a movement limiting structure such as cup-shaped element 155 is employed, it should generally have a Young's modulus of similar order of magnitude to that of the object 150 in order to assist in establishing oscillation around the rest position at a resonant frequency determined by the characteristics of the one or more magnets 130, 135 and object 150.

Figure 7:
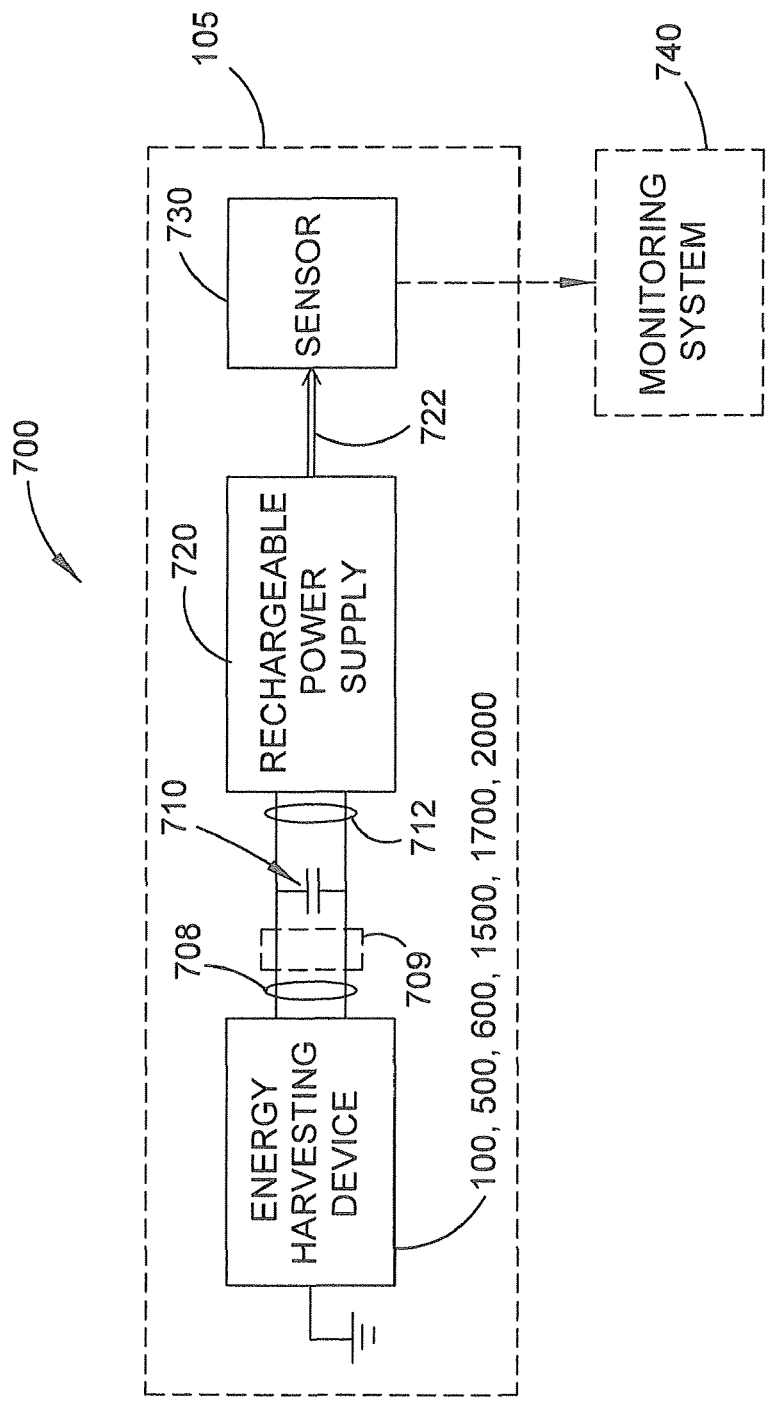
FIG. 7 is a schematic illustration of a system deriving electrical energy from described energy conversion device embodiments.

Referring also to FIG. 7, a system 700 is shown, in which an energy harvesting device (according to any of the described configurations, including arrangements 100, 500, 600, 1500, 1700 and 2000) is employed within or on a host structure 105 and electrically coupled to a rechargeable power supply 720 via a capacitor 710 of suitable size and coupling conductors 708, 712. Although not shown, conductors are coupled to the piezoelectric layer of MP element 140 or to EM transducer elements 1740, 2040 to allow transfer of electrical charge outside of the energy harvesting device. These conductors are coupled to capacitor 710 (e.g. via conductors 708) and their signals may pass through a rectification circuit or devices 709 (e.g. diodes, transistors or electrical transformers). In this way, device 100, 500, 600, 1500, 1700 or 2000 can charge capacitor 710 from its oscillating electrical output, and capacitor 710 can in turn be used to trickle charge the rechargeable power supply 720. Power supply 720 is then used to provide power via a suitable conductor 722 to a sensor 730. Sensor 730 may be any suitable sensor, such as a strain, load, humidity, temperature, pressure, distance, flow or other sensor adapted to be powered by a relatively low power supply (e.g. where the output power of the energy harvesting device 100 is in the order of 0 to 200 microwatts or possibly up to tens or hundreds of milliwatts).

System 700 may be contained within an external shell, hull or skin of the host structure 105 in some applications, such as in marine, automotive or aerospace applications, where the sensor 730 is an environmental sensor positioned to monitor structural health of part of the craft. In such applications, sensor 730 may communicate in a wired or wireless manner with a monitoring system 740 in another part of the craft or external to the craft. For example, an external handheld interrogator may be used to interrogate the sensor 730 via a suitable interface, such as an acoustic-electric feed-through interface positioned on an inside of the skin of the craft, for example. It should be appreciated that system 700 may be applied in various other situations outside of marine, automotive and aerospace fields and thus the examples given should not be considered as anything other than illustrative.

In some embodiments, MP element 140 may be comprised of a number of separate but aggregated MP elements, each providing a separate output in order to reduce an averaging effect that would be experienced across a single larger MP element and allow greater power to be harvested from certain MP elements that experience greater strain due to higher local magnetic field variation than in other areas. For example, MP element 140 may be made up of an array of tiled sub-elements arranged in the x-y plane (where the x direction is into the page as shown in the Figures).

Described embodiments advantageously utilise a bi-axial vibro-impact effect (set up by oscillation of the object about the rest position and elastic impact of the object with the movement limiting structure) to yield a relatively broad frequency response of the energy conversion device 100 to vibration of the host structure 105.

In an experiment to validate the hypothesised operation of the device 100, the steel bearing was Cr-plated and spherical with a diameter of 25.4 mm; the rare-earth magnets (NdFeB, grade N42) and the ME transducer were cylindrical, with a diameter of 10 mm.

The ME transducer was formed by bonding the Terfenol-D (Etrema Products Inc.) and PZT-5A elements (Pz27, Ferroperm Piezoceramics A/S) with silver loaded epoxy (Circuitworks CW2400) that was cured for two hours at 55 C under a compressive load of ~1 MPA. To maximize output from the ME transducer the magnetostrictive and piezoelectric layers are 1.5 mm and 0.5 mm thick respectively. The host structure oscillates in the x-y plane. The magnets, and the piezoceramic 3-direction, are poled in the z-direction. The magnets are 10 mm thick, and for experimental convenience two magnets were stacked together for a total magnet thickness of 20 mm, and attached to a 5 mm thick steel base. A thin layer of bees wax was employed at the interface between the ME transducer and the upper magnet to minimize shear movement.

The bearing is subject to a magnetic restoring force in the x-y plane (where x is normal to the page and the y-z plane is parallel to the page, as in FIG. 2) exerted by the magnetic field of the magnets, however is otherwise untethered and free to move across the surface of the upper magnetostrictive element in response to host structure oscillations. Comsol multiphysics software was used to make predictions about the restoring force Fy (rotational effects were ignored). Magnetic force predictions were made (shown in FIG. 8) assuming that the ME transducer acted as a 3.5 mm gap between the magnet and the bearing (i.e. there is a 3.5 mm separation between the bearing and the magnet in the z-direction. Stable finite element solutions were obtained if the maximum element dimension chosen was 1.5 mm or less, and also if the meshing of the magnet and bearing were of sufficient fidelity (i.e. so that the finite element mesh contains small enough elements to adequately represent the modelled shapes).

Figure 8:
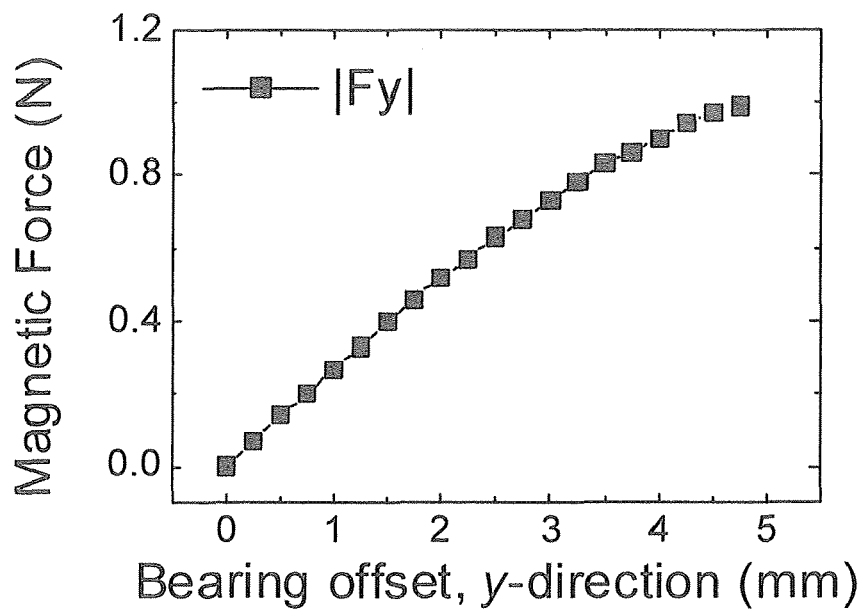
FIG. 8 is a plot of predictions of a magnetic restoring force acting on a bearing as a function of distance from a vertical centre line of the device of some embodiments.

The central-line of the harvester is defined as the vertical line (z-direction) through the centre of the magnet, as shown by reference indicator 170 in FIG. 2. FIG. 8 predicts that Fy is linear near the central-line (i.e. y≤2.0 mm) and has a spring constant of k=260 N/m. The bearing mass is approximately m=67 grams, and hence the predicted resonant frequency of the bearing/magnet arrangement is $f_{RESONANCE} = (1/2\pi)\sqrt{k/m} \sim 9.9$ Hz. As the bearing moves from the central-line (towards the edge of the magnet) then FIG. 8 predicts that the restoring force Fy will behave as a softening-spring.

The magnetic restoring force acting on the bearing in the x-y plane is axi-symmetric about the harvester's central-line 170. If a bi-axial host acceleration is applied (i.e. in the x-y plane), then the bearing would be expected to map out a lissajous figure on the surface of the ME transducer. The rest position for the bearing is directly above the centre of the magnet, along the central-line 170. For other magnet and bearing diameters, $D_{MAGNET}$ and $D_{BEARING}$, the bearing rest position will remain at the central-line as long as $D_{MAGNET} \lesssim D_{BEARING}$. For a given ratio $D_{MAGNET}/$ $D_{BEARING}$, the scaling laws that apply are: $F_{RESTORING} \alpha \, D_{BEARING}$, $k \, \alpha \, D_{BEARING}$, and $f_{RESONANCE} \, \alpha \, 1/D_{BEARING}$.

The Comsol software was also used to visualize the static magnetic field distribution for various bearing positions. Of particular interest is the distribution of magnetic flux B in the ME transducer, since this determines the stress distribution in the transducer, and hence the voltage generated. Two dimensional modelling of the Terfenol-D nonlinear magnetostrictive response was carried out. Predicted magnetic field distributions are shown in FIGS. 3A and 3B, which magnifies the contact region between the bearing/ME transducer. In FIG. 3A the bearing is located at the central-line and contacting the middle of the upper Terfenol-D element, whereas in FIG. 3B the bearing is located 4.5 mm from the central-line in the y-direction. These figures show that the magnetic flux distribution in the upper Terfenol-D element changes significantly as the bearing changes position.

Figure 9:
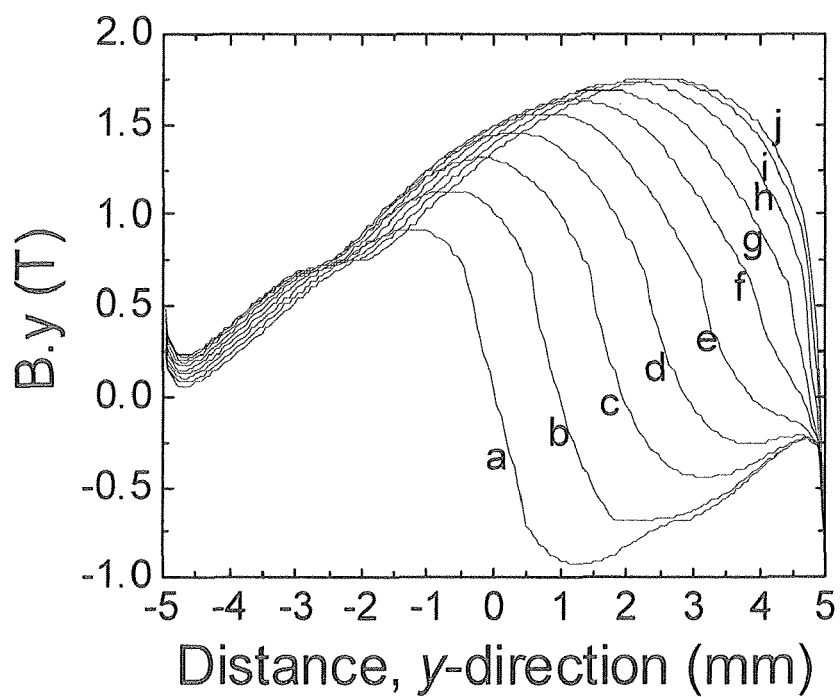
FIG. 9 is a plot of predicted magnetic flux density in the y-direction as a function of distance along a lower edge of an upper magnetostrictive element.
Figure 10:
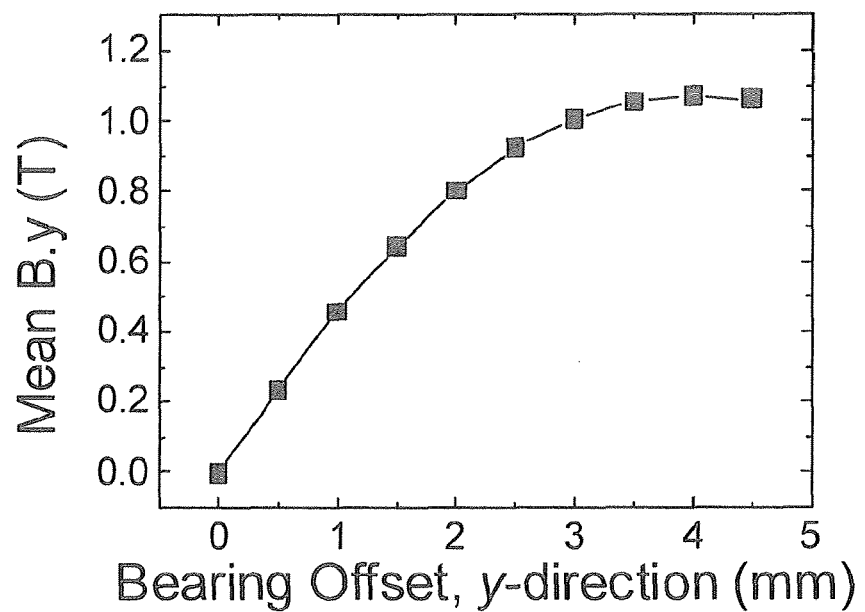
FIG. 10 is a plot of the mean magnetic flux density in the y-direction as a function of bearing offset corresponding to bearing offset lines a to j shown in FIG. 9.

A closer examination of the predictions of the magnetic flux density B, in the y-direction, for the upper Terfenol-D element is presented in FIG. 9. As the bearing moves across the surface of the upper Terfenol-D element (from the centre to the edge) FIG. 9 shows that B.y changes direction. The bearing is steering the magnetic field through the ME transducer. FIG. 10 presents the average of each B.y line (a to j) plotted in FIG. 9. The large changes in both the magnitude and direction of the magnetic flux suggest that significant strain variations are being experienced at the piezoceramic layer.

Figure 11:
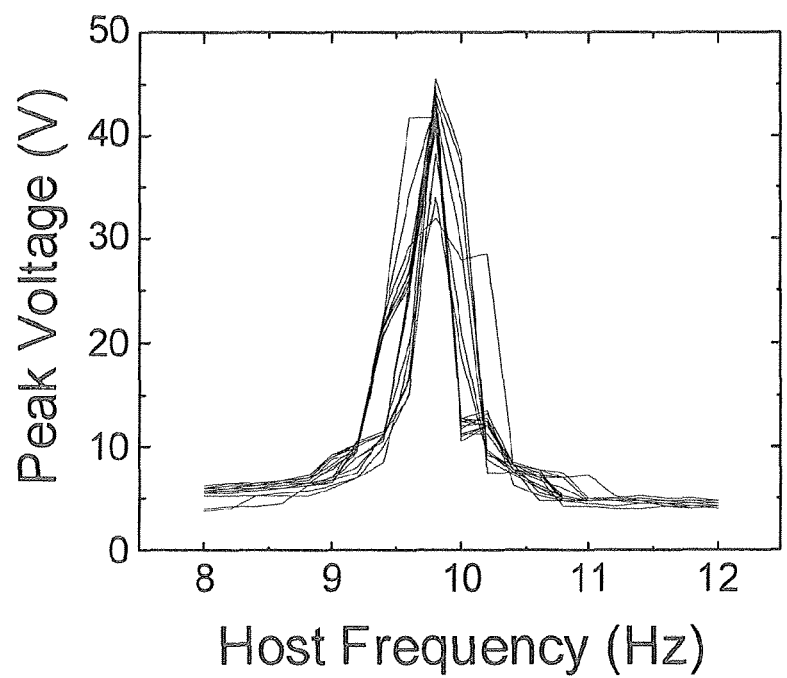
FIG. 11 is a plot of peak open circuit voltage as a function of drive frequency and angle for a device arrangement generally corresponding to FIG. 4.
Figure 12:
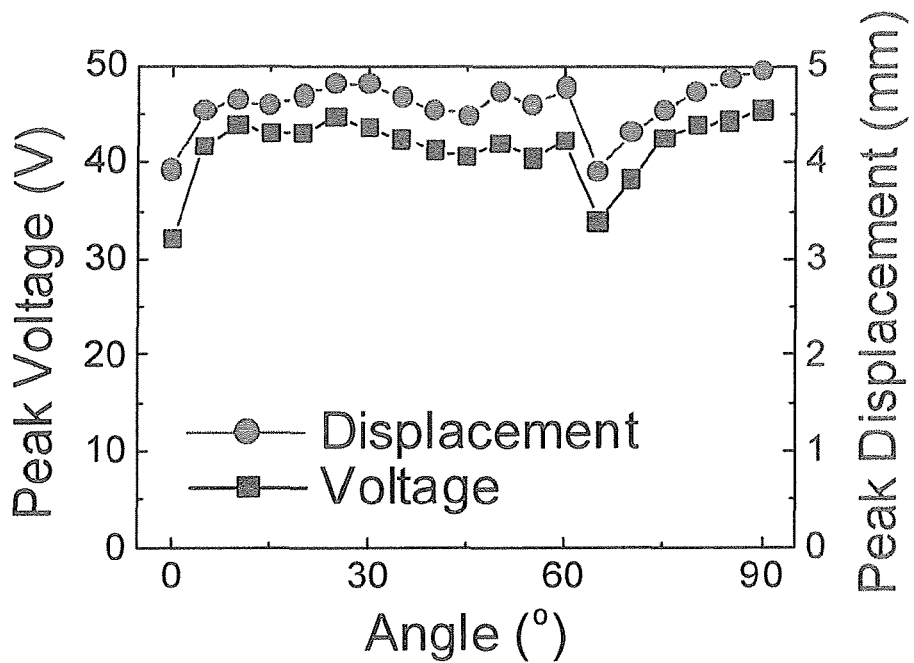
FIG. 12 is a plot of peak voltage and displacement (at resonance) as a function of drive angle.

In the experimental arrangement, the harvester device 100 (as generally depicted in FIG. 4) was attached to a 5 kg host mass, connected to a 75 N vibration shaker. A maximum RMS host acceleration of 61 mG was chosen because, at resonance, larger host accelerations would drive the bearing off the ME transducer (unless a movement limiting housing 155 is used to constrain the bearing displacement and also introduce a vibro-impact effect). The bi-axial nature of the energy harvester is clearly seen in FIGS. 11 and 12. FIG. 11 is a graph showing nineteen measured frequency sweeps of the peak open circuit voltage generated by the harvester device. Sweeps were measured from low to high frequency, in 0.2 Hz steps. A laser displacement sensor was used to measure the bearing displacement (y-direction) during testing. The host acceleration was uni-axial in the y-direction. After each sweep the harvester was rotated by 5 degrees (about the harvester's central-line) from the initial position, designated as angle 0° through to an angle of 90°. The resonant maximum of each sweep was located at 9.8 Hz, similar to the predicted resonant frequency of about 9.9 Hz predicted above. FIG. 12 shows the maximum measured peak open circuit of the sweeps shown in FIG. 11).

Figure 13:
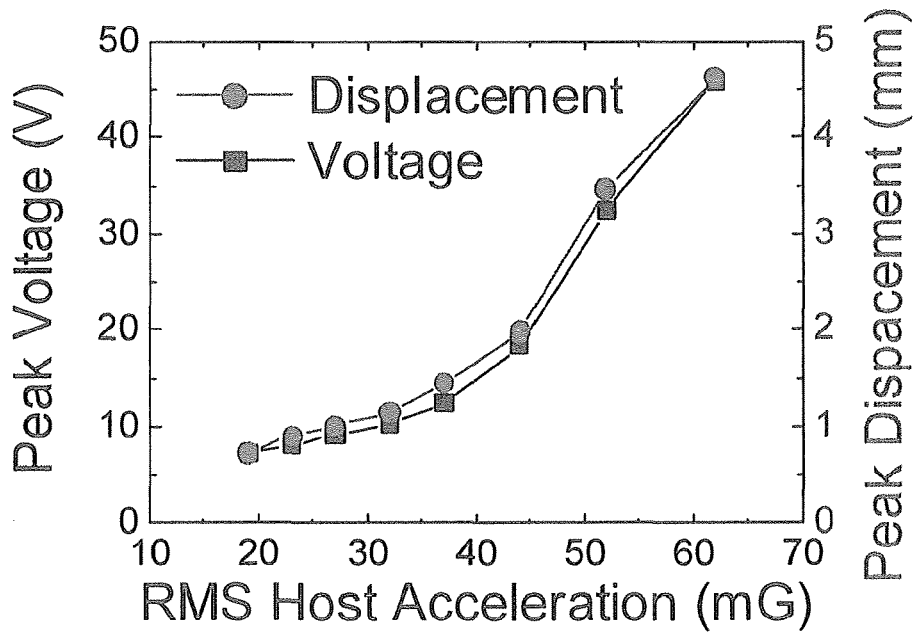
FIG. 13 is a plot of measured peak open circuit voltage and object peak displacement (at resonance) as a function of RMS host acceleration.

The peak open circuit voltage of the harvester, and the peak displacement of the bearing, were measured as a function of RMS host acceleration. As the host acceleration was varied, there was no significant change in the frequency of the resonant peak. FIG. 13 shows that below an RMS host acceleration of 40 mG, the measured open circuit voltages (and bearing displacement) increase in a linear fashion. There is however, a clear gradient increase for both displacement and voltage when the RMS host acceleration is larger that ~40 mG. It is surmised that the behaviour shown in FIG. 13 is due to the softening-spring effect (as described earlier, FIG. 8).

Figure 14:
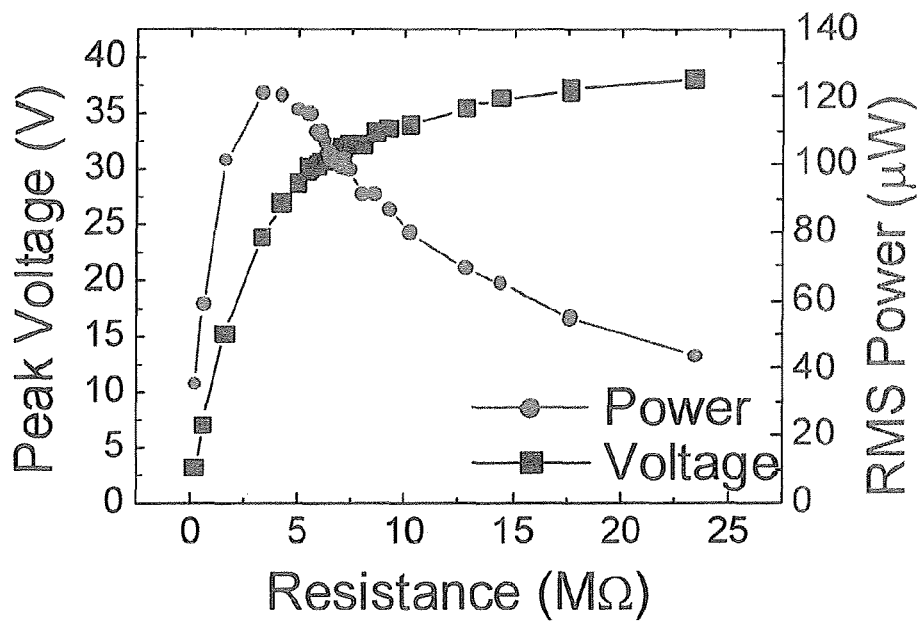
FIG. 14 is a plot of measured maximum peak voltage and RMS power as a function of load resistance.

A load resistor sweep was carried out to determine the RMS output power of the harvester. Using an RMS host acceleration of 61 mG at 9.8 Hz, the measured peak load voltage was 23.9 V across a 3.3 MΩ load resistor, yielding a maximum RMS load power of 121 μW (as shown in the plot of FIG. 14). At the maximum load power, the measured peak bearing displacement was 4.61 mm, hence the peak kinetic energy of the 67 gram bearing is estimated to be about 2.7 mJ. Surface wear at the bearing/Terfenol-D interface has been found to be an issue for arrangements where the bearing bears directly on the upper (exposed) surface of the magnetostrictive layer 142.

In summary, a bi-axial vibration energy harvesting approach has been demonstrated that utilizes a magnetoelectric transducer (Terfenol-D/lead zirconate titanate/Terfenol-D) located between an oscillating spherical steel bearing and a rare-earth magnet (NdFeB). The oscillating bearing varies the magnetic field through the ME transducer, generating an oscillating charge that can be harvested. A bi-axial device has been developed that is capable of harvesting 121 μW from an RMShost acceleration of 61 mG at 9.8 Hz. The approach described produces an effective bi-axial characteristic that may in the future be useful for kinetic energy harvesting for applications where the host accelerations are multi-axial (such as those seen in the aerospace environment).

Figure 15:
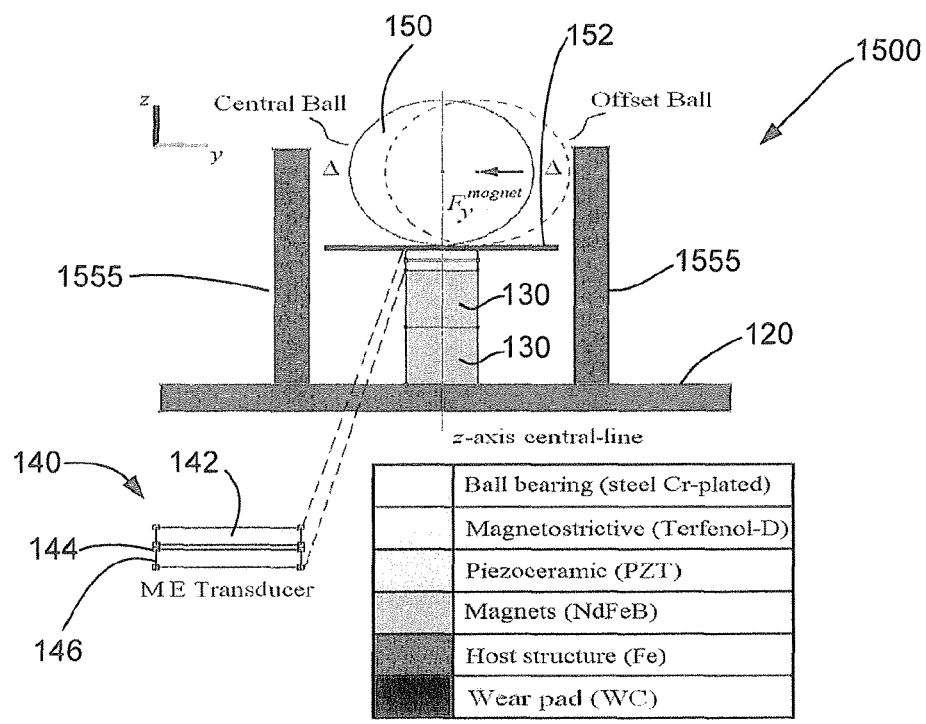
FIG. 15 is a schematic illustration of elements of a vibration energy conversion device according to some embodiments.

FIG. 15 illustrates schematically components of a device 1500 for vibration energy conversion according to further embodiments. Device 1500 is similar to device 100 in that it has the object 150 arranged similarly with respect to base 120, magnets 130, MP element 140 and preferably also a wear pad 152 interposed between the MP element 140 and the object 150. Device 1500 is also housed within a casing 110, although this is not shown in FIG. 15.

Additionally, walls 1555 are positioned around the object 150 to define a free movement volume within which the object 150 is free to move. The walls 1555 act as movement limiting structure so that translational movement of the center of mass of the object 150 laterally beyond the edge of the MP element 140 or EM coil 1740 (FIG. 17) or 2040 (FIG. 20) is restricted but not necessarily prevented. In laboratory experiments it has been observed that allowing the center of mass of a ball bearing to travel a small (compared to the bearing diameter) distance beyond the edge of the MP element 140 improves harvested energy. For MP elements, travel of the bearing a small distance past the edge serves to pull the magnetic field of the magnet 130 more horizontally (if central axis 170 is vertical), which serves to exert a stronger magnetostrictive effect on the MP element 140. For EM coils, travel of the bearing a small distance beyond the edge of the coil can be beneficial because it is desirable have the bearing travel across the coil in a way that maximizes the change in magnetic flux over time in order to maximize the current generated in the coil.

The walls 1555, which may be made of sheets or panels in a cylindrical form, for example, may be selected to have a Young's modulus less (and possibly substantially less) than that of the object 150 but preferably without exhibiting an appreciable dampening effect on oscillatory movement of the object 150 in response to vibration of the host structure 105. The material of the walls 1555 may include or be formed of aluminium, rubber or rubber like materials, alumina ceramic materials or suitable PTFE materials or similar polymers.

Although the walls 1555 provide a movement limiting function to prevent the object 150 from laterally escaping the magnetic field of magnet 130, the walls 1555 also assist in providing a vibro-impact effect that tends to broaden the frequency response of the device to vibration stimulus transferred through the host structure 105. This has been experimentally validated, as described below.

Figure 16:
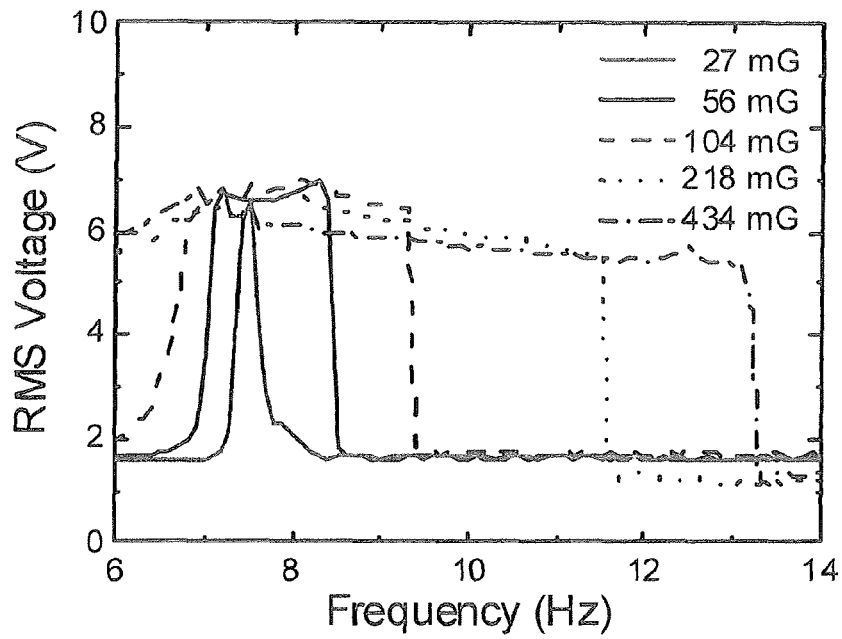
FIG. 16 is a plot of measured open circuit voltage as a function of RMS host acceleration and frequency for the vibration energy conversion device shown in FIG. 15.

FIG. 16 shows measured open-circuit voltage of the MP element 140 as a function of host acceleration and frequency using an experimental arrangement similar to that shown in FIG. 15. The data presented in FIG. 16 has been low-pass filtered with a cutoff frequency of 25 Hz.

FIG. 15 shows a schematic illustration of the permanent-magnet/ball-bearing oscillator arrangement used by the harvester, including the relative location of the ME transducer 140. A chrome-steel ball-bearing (grade AISI 52100) with a radius of 12.7 mm was used for the object 150. The bearing is allowed to roll on a 0.8 mm thick, 15 mm radius tungsten carbide (6% cobalt by mass) wear-pad 152 that is used to protect the upper surface of the ME transducer 140. The rare-earth magnets 130 (NdFeB, grade N42) and the ME transducer 140 are cylindrical, and have a radius of 5 mm.

The ME transducer 140 was formed by bonding the Terfenol-D (Etrema Products) and lead zirconate titanate elements (Ferroperm Piezoceramics Pz27) with silver loaded epoxy (Circuitworks CW2400) that was cured for two hours at 65° C. In order to maximize output from the ME transducer 140 the magnetostrictive and piezoelectric layers were made 1.5 mm and 0.5 mm thick, respectively. The magnets 130, and the piezoceramic 3-direction are poled in the z-direction. The magnets 130 are 10 mm thick, and for convenience two magnets 130 were stacked together and magnetically attached to a 5 mm thick steel base 120.

The experimental arrangement had the vibration energy harvester 1500 attached to a 5 kg host mass, connected to a 75 N vibration shaker. As shown in FIG. 15, mechanical stops (i.e. walls 1555) were created by bolting three aluminium spacers (each 3 mm thick for a total 9 mm) to each side of a steel housing with wall thickness 10 mm. During an impact event, the bearing collides with an aluminium surface, with the mechanical impulse load then transferred into the steel housing. The total inner distance between the two mechanical stops was 32.5 mm. Given that the bearing radius was 12.7 mm, the stop-gap distance is calculated as $\Delta \sim (32.5 - 2 \times 12.7$ mm$)/2 \sim 3.5$ mm.

An accelerometer mounted on the 5 kg host mass was used to set the desired RMS host acceleration, at host frequency 7.5 Hz, prior to sweeping the frequency. Frequencies from 6 Hz to 14 Hz were swept in 0.1 Hz steps. Host frequencies below 6 Hz were not examined due to frequency limitations of the vibration shaker. Host acceleration variation was within ±10 mG during a sweep (where 1 G=9.8 m/s$^2$). Dwell time at each frequency was 10 seconds, after which time the next frequency step was immediately applied (with care taken to ensure a smooth transition between frequency steps). Voltage and power measurements were made using a differential probe and oscilloscope. The measurement sampling rate was 12 kSPS. The measured capacitance of the ME transducer 140 was 1.86 nF, suggesting an impedance at 8 Hz of $X_C = 1/(2\pi fC) \sim 10.7$ MΩ. This impedance is larger than the 8 MΩ input impedance of the differential probe (Hameg HZ109), so a large resistance (90 MΩ) was added in series with the probe to ensure that the transducer voltages were measured accurately.

As shown in FIG. 16, for the smallest host acceleration used, 27 mG, there was little or no interaction between the harvester's oscillating bearing and the mechanical stops (i.e. no vibro-impact), and hence the half-power frequency bandwidth is a relatively narrow ~0.23 Hz and centered at 7.5 Hz. The measured central frequency of 7.5 Hz is marginally lower than the predicted resonant frequency of 8.1 Hz, presumably because of the softening-spring effect. As the host acceleration is increased, a vibro-impact process between the bearing and the aluminum stops occurs, producing an increase in the operational frequency bandwidth of the vibration energy conversion device 1500. The largest host acceleration used, 434 mG, produced the largest bandwidth, ~7.2 Hz, approximately 31 times greater than the bandwidth observed using a 27 mG host acceleration. The amount of frequency bandwidth increase is governed by the physical process of vibro-impact, which is a non-linear effect.

As stated above, in some embodiments, MP element 140 may be substituted for a different transducer element in the form of an electromagnetic coil for generation of a potential difference across output conductors 708. Examples of energy harvesting devices 1700 and 2000 using EM coils as a transducer element are shown and described in relation to FIGS. 17 and 20.

Figure 17:
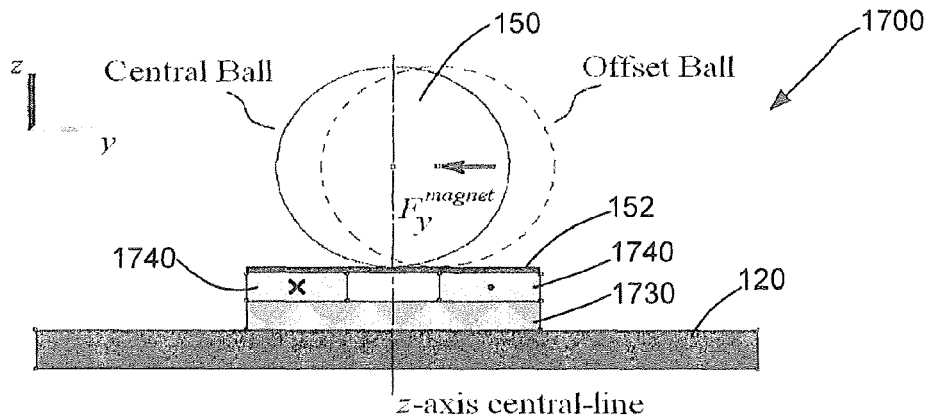
FIG. 17 is a schematic illustration of elements of a vibration energy conversion device according to further embodiments.

Referring in particular to FIG. 17, energy harvesting device 1700 is shown schematically to include the untethered movable object 150 (as a ball bearing) attracted by a disc magnet 1730 affixed to a base 120. The magnet 1730 supports an EM coil 1740 that is interposed between the magnet 1730 and the object 150. A wear pad 152 is positioned over the EM coil 1740 to protect it from wear and to allow the object 150 to move (roll) with relative freedom. Thus, variations in the magnetic field of the magnet 1730 due to movement of the object 150 affect the magnetic field of the EM coil and induce a current in the EM coil. This current can then be harvested, stored and used to power another device in the manner described above in relation to FIG. 7.

Depending on the arrangement of the outputs of the EM coil, the electronics between the harvesting device 1700 or 2000 and the rechargeable power supply 720 may need to be adapted to suitable process and harvest the output power. For example, circuitry 709 may include a step-up voltage transformer in order to provide a useable output voltage to the rechargeable power supply 720 (or other power sink).

To test the possible use of the magnet/coil transduction mechanism, the arrangement 1700 depicted schematically in FIG. 17 was examined. The static magnetic field arrangement was modelled using Comsol, and then a prototype was built and experimentally tested.

Referring to FIG. 17, as the bearing oscillates in the x-y plane (where x is normal to the page) the magnetic field distribution in the coil changes. FIG. 17 illustrates one possible non-optimised coil orientation. Different coil configurations may be employed to greater or different effect. For example, a segmented EM coil arranged as a toroid about a donut-shaped magnet may be used, as described below in relation to FIG. 20. Additionally, more than one EM transducer may be employed, with multiple EM transducers disposed near the magnet and object 150 to have their magnetic fields affected by movement of the object 150, for example in a similar manner to the arrangements shown in FIGS. 5 and 6. However, arrangements other than those of FIGS. 5 and 6 may be employed.

Figure 18:
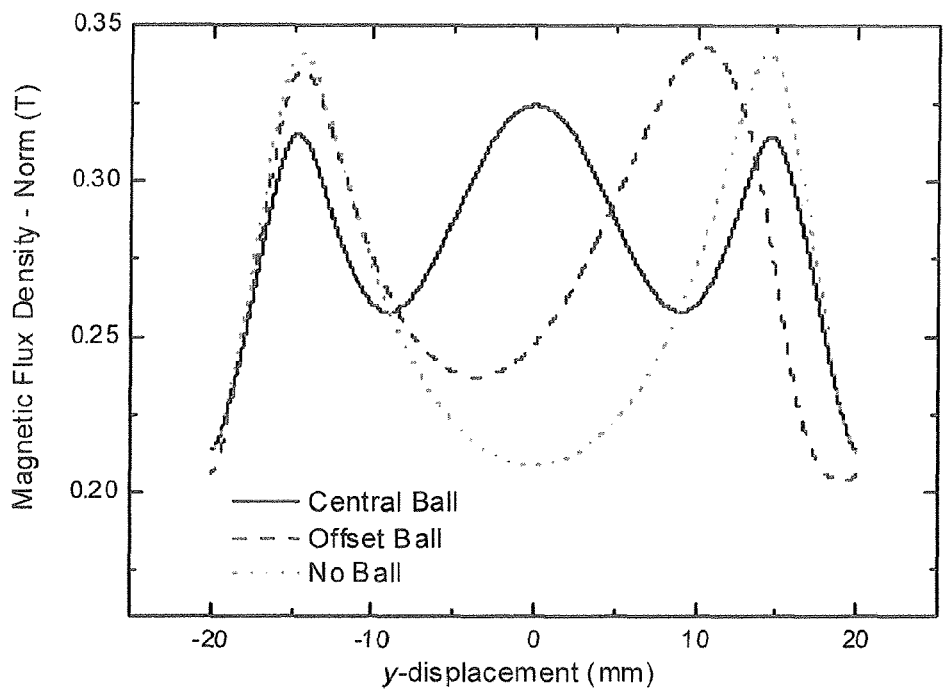
FIG. 18 is a plot of predicted static magnetic flux density for three different object states for the vibration energy conversion device shown in FIG. 17.

For the arrangement 1700 shown in FIG. 17, FIG. 18 shows the predicted static magnetic flux density for three bearing arrangements: the bearing 150 in a centered position ('Central Ball'); the bearing displaced from that position ('Offset Ball') at y=15 mm; and with no bearing. As the bearing 150 moves from its rest position towards the edge, a region of varying magnetic field passes through the coil, which in turn induces a time-varying current in the coil that generates a voltage across an attached load resistance.

An experimental arrangement similar to that shown in FIG. 6a was investigated. A chrome-steel ball-bearing (grade AISI 52100) with a diameter of 25.4 mm was used, and a 30 mm diameter tungsten carbide (6% cobalt by mass) wear-pad was used to protect the upper surface of the wound coil and to provide a surface for the bearing to move on. A 238 turn coil was wound from copper wire with diameter 300 µm, and had a measured inductance of 4.1 mH and a measured resistance of 7.5Ω. The coil had a height of 4.2 mm, with an approximate outer diameter of 30 mm and inner diameter of 10 mm. For the system described, Comsol magnetic field predictions (as shown in FIG. 18) indicated a field differential of approximately 100 mT as the bearing moves from the central position to an edge (15 mm from the centre). The 10 mm inner coil diameter was chosen since it is similar to the width of the middle magnetic flux peak for the Central Ball as shown in FIG. 18.

Figure 19:
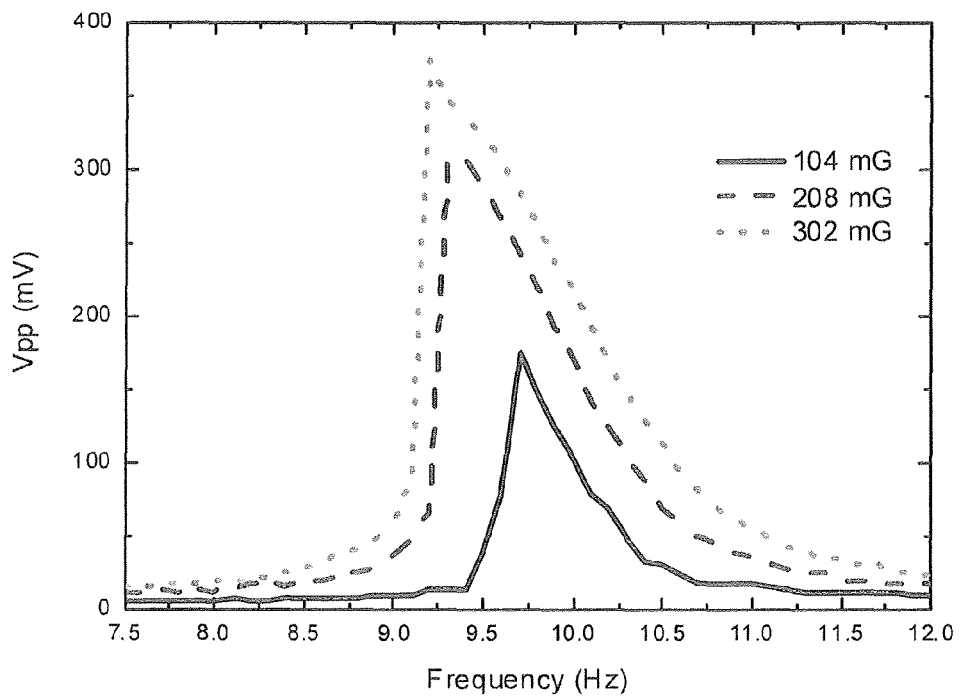
FIG. 19 is a plot of measured peak to peak coil voltage across an optimised load for the vibration energy conversion device shown in FIG. 17.

A near optimum resistive load of 7.5Ω was applied and, as shown in FIG. 19, a series of sweeps were carried out to determine the output voltage and power from the harvesting arrangement. For the three host acceleration levels shown in FIG. 19, the frequency was swept upwards through the range 7.5 and 12 Hz in 0.1 Hz steps, with a 10 second dwell at each frequency step.

The measured results shown in FIG. 19 are peak-peak coil voltages across an optimised 7.5Ω resistive load using the harvesting arrangement 1700 of FIG. 17, and show a softening resonant response. As the host acceleration increases, so does the resonant displacement amplitude of the bearing, producing larger output voltages across the optimised load. Table 1 below summarises the measured response from the harvesting arrangement, and shows that the measured maximum RMS output power was 2.5 mW for an RMS host acceleration of 302 mG at 9.2 Hz.

TABLE 1

Summary of measured results from magnet/coil harvesting arrangement.

| RMS Host Acceleration (mG) | Frequency Response Range (Hz) | | Band (Hz) | Maximum Vpp (mV) | RMS Maximum Power (mW) |
|---|---|---|---|---|---|
| 104 | 9.6 | 10.3 | 0.7 | 173.8 | 0.54 |
| 208 | 9.3 | 10.4 | 1.1 | 305.9 | 1.67 |
| 302 | 9.2 | 10.5 | 1.3 | 374.2 | 2.50 |

It has been observed that for certain bearing/magnet geometries and at certain host frequencies and accelerations, the described bi-axial magnet/bearing harvesting arrangement has a tendency to produce elliptical (or circular) ball-bearing displacements (or orbits). This tendency can be exploited to convert a translational host acceleration into an elliptical ball displacement. Using a wire coil of appropriate geometry as the mechanical-to-electrical transducer this can form the basis of a bi-axial vibration energy harvester.

A schematic illustration of an arrangement 2000 of this type of vibration energy harvesting device is shown in FIG. 20. A ball bearing 150 moves on a wear pad 152 mounted directly over a coil transducer 2040. For the example configuration shown in FIG. 20, a toroidal coil 2040 is shown wound around a donut shaped (annular) magnet 2030 (with the magnet poled in the vertical z-direction, normal to the plane of the wear pad 152 and base 120). The host acceleration acts in the x-y plane, as indicated by arrows 2020. The center frequency is:

$$f_R = (1/2\pi)\sqrt{k_r^{magnet}/M}$$

where the bearing mass is M (kg), and $k_r^{magnet}$ (N/m) is the small amplitude spring constant of the magnetic force (in the x-y plane) acting on the bearing 150. For host accelerations with frequencies close to $f_R$ the bearing 150 may begin to undergo a resonant motion in the form of an elliptical displacement. Interestingly, once a resonant ball motion has been established, then the host frequency may be varied over a wideband and the ball bearing's resonant motion is maintained.

The use of a suitable configured coil in an arrangement such as that shown in FIG. 20 offers the prospect of frequency up-conversion, whereby a low frequency mechanical excitation may be converted into a higher frequency electrical output that can be beneficial for vibration energy harvesting. Additionally, a harvester with a suitably arranged coil, such as the toroidal coil 2040 shown in FIG. 20, may remove the necessity for signal rectification, thus improving harvester efficiency and also simplifying the harvesting electronics in between the device 2000 and the rechargeable power supply 720.

Although FIGS. 17 and 20 do not specifically show movement limiting structure to limit movement of the object 150 past the edge of the wear pad 152, it is intended that such movement limiting structure be provided as shown in FIGS. 1A, 1B, 15 or in another suitable form. Similarly, the magnet, EM coil and bearing arrangement of FIGS. 17 and 20 are suitably enclosed by housing structure, for example in the manner described above in relation to FIGS. 1A, 1B, 4, 5 and 6.

Embodiments described above may additionally include one or more further magnets positioned laterally adjacent the magnet 130, 1730 or 2030 in combination with a wear pad or other extended surface that allows the object 150 to travel close enough to the one or more additional magnets that the object becomes more attracted to one such magnet and tends toward a point of stability (absent externally applied vibration) adjacent that magnet. For such embodiments, the at least one transducer element includes one or more additional MP element 140 or EM coil 1740, 2040 arranged adjacent the additional magnet or the at least one transducer element (embodied as an MP element 140 or EM coil 1740, 2040, for example) is made large enough to be affected by changes in the magnetic field of the additional magnet. This arrangement may be described as being bi-stable or multi-stable as it may use two or more points of stability corresponding to peak magnetic attraction of the underlying magnets 130, 1730 or 2030.

Embodiments are contemplated in which an EM coil 1740, 2040 and MP element 140 may be used in combination as transducers positioned to harvest energy due to movement of the same object 150 within a single vibration energy harvesting device.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The embodiments and examples set forth herein are provided for illustrative purposes and are not intended to limit the operation or application of the invention. Various modifications or enhancements of the described embodiments may be made while remaining within the spirit of the invention. This description should therefore not be construed in a narrowing or limiting fashion.

The invention claimed is:

1. A vibration energy conversion device, comprising:
a casing;
a magnet disposed in the casing;
an untethered object in the casing attracted to the magnet and free to move relative to the magnet in at least two translational degrees of freedom; and
at least one transducer element positioned to be affected by changes in a magnetic field of the magnet;
wherein movement of the object relative to the magnet varies the magnetic field through the at least one transducer element, thereby generating electrical potential across at least a part of the at least one transducer element; and
wherein, in the absence of vibration experienced by the casing, the magnet tends to retain the object in a rest position.

2. An energy conversion device comprising:
a casing;
a magnet disposed in the casing;
an object in the casing attracted to the magnet and free to move relative to the magnet in at least two translational degrees of freedom; and
at least one transducer element positioned to be affected by changes in a magnetic field of the magnet;
wherein movement of the object relative to the magnet varies the magnetic field through the at least one transducer element, thereby generating electrical potential across at least a part of the at least one transducer element; and
wherein the magnet is positioned to exert a magnetic restoring force on the object to bias the object to a rest position.

3. The device of claim 2, wherein the at least one transducer element comprises at least one magnetostrictive piezoelectric (MP) element.

4. The device of claim 3, wherein the electrical potential is generated by a piezoelectric part of the MP element in response to stress induced in at least one magnetostrictive part of the MP element by variations in the magnetic field.

5. The device of claim 2, wherein the at least one transducer element comprises at least one electromagnetic (EM) transducer element.

6. The device of claim 5, wherein the at least one EM transducer element comprises at least one *E. coli*.

7. The device of claim 6, wherein the at least one *E. coli* is disposed around the magnet.

8. The device of claim 2, wherein the object is rounded.

9. The device of claim 8, wherein the object is one of: spheroid, part-spheroid, frusto-spheroid, ovoid and part-ovoid.

10. The device of claim 2, wherein the object is solid.

11. The device of claim 2, wherein the object has one or more rotational degrees of freedom.

12. The device of claim 2, wherein the object is a ball bearing.

13. The device of claim 2, wherein the magnet is disposed at a fixed position in the casing.

14. The device of claim 2, wherein the casing comprises a closed magnetically conductive container.

15. The device of claim 2, wherein, in an absence of vibration experienced by the casing, the magnet tends to retain the object in a rest position.

16. The device of claim 15, wherein, in a presence of vibration experienced by the casing, the object tends to oscillate about the rest position.

17. The device of claim 1, wherein the magnet is positioned to exert a magnetic restoring force on the object to bias the object to a rest position.

18. The device of claim 2, wherein when the object is at rest, the object and magnet are substantially axi-symmetric about a single axis.

19. The device of claim 2, wherein the magnet is poled in a direction substantially orthogonal to a plane in which the object is free to move.

20. The device of claim 2, further comprising a movement limiting structure disposed around the object to limit movement of the object relative to the magnet.

21. The device of claim 2, wherein the magnet is one of a plurality of such magnets disposed in the casing.

22. The device of claim 2, wherein the at least one transducer element comprises at least two transducer elements positioned to be affected by the magnetic field of the magnet.

23. The device of claim 22, wherein two of the at least two transducer elements are disposed on opposite sides of the object.

24. The device of claim 2, wherein one transducer element of the at least one transducer element is disposed adjacent a rest position of the object.

25. The device of claim 2, wherein one transducer element of the at least one transducer element is disposed between the object and the magnet.

26. The device of claim 2, wherein the at least one transducer element comprises a plurality of segmented transducer sub-elements, each transducer sub-element configured to generate electrical potential independently of other transducer sub-elements in response to variation of the magnetic field.

27. The device of claim 2, further comprising structural means in the casing to broaden a frequency response of the device to vibration experienced by the device.

* * * * *

UNITED STATES PATENT AND TRADEMARK OFFICE
CERTIFICATE OF CORRECTION

Page 1 of 1

PATENT NO.        : 8,853,870 B2
APPLICATION NO.   : 13/464701
DATED             : October 7, 2014
INVENTOR(S)       : Scott David Moss It is certified that error appears in the above-identified patent and that said Letters Patent is hereby corrected as shown below:

In the Claims

Column 17, Line 45:
"transducer element comprises at least one *E. coli.*" should read, --transducer element comprises at least one EM coil.--.

Column 17, Line 46:
"7. The device of claim 6, wherein the at least one *E. coli* is" should read, --7. The device of claim 6, wherein the at least one EM coil is--.

Signed and Sealed this
Twenty-ninth Day of September, 2015

Michelle K. Lee
*Director of the United States Patent and Trademark Office*